United States Patent
Ly et al.

(10) Patent No.: US 11,121,794 B2
(45) Date of Patent: Sep. 14, 2021

(54) CONFIGURABLE SYNCHRONIZATION IN NEXT GENERATION WIRELESS NETWORKS

(71) Applicant: QUALCOMM Incorporated, San Diego, CA (US)

(72) Inventors: Hung Ly, San Diego, CA (US); Heechoon Lee, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 292 days.

(21) Appl. No.: 15/497,119

(22) Filed: Apr. 25, 2017

(65) Prior Publication Data
US 2018/0109344 A1 Apr. 19, 2018

Related U.S. Application Data

(60) Provisional application No. 62/409,301, filed on Oct. 17, 2016.

(51) Int. Cl.
*H04J 11/00* (2006.01)
*H04L 5/00* (2006.01)
(Continued)

(52) U.S. Cl.
CPC .......... *H04J 11/0073* (2013.01); *H04J 11/00* (2013.01); *H04J 11/0069* (2013.01); *H04L 5/00* (2013.01);
(Continued)

(58) Field of Classification Search
CPC ....... H04L 27/2613; H04L 5/14; H04L 27/00; H04W 56/0085; H04W 88/10;
(Continued)

(56) References Cited

U.S. PATENT DOCUMENTS

| | | | |
|---|---|---|---|
| 2002/0021718 A1* | 2/2002 | Kerhuel | H04B 7/2681 370/509 |
| 2005/0249142 A1* | 11/2005 | Kim | H04H 60/72 370/312 |

(Continued)

FOREIGN PATENT DOCUMENTS

| | | |
|---|---|---|
| CN | 105075354 A | 11/2015 |
| WO | WO-2015114562 A1 | 8/2015 |

OTHER PUBLICATIONS

Alcatel-Lucent, PBCH coverage extension for MTC devices, Apr. 19, 2013, 4 pages (Year: 2013).*

(Continued)

*Primary Examiner* — Faruk Hamza
*Assistant Examiner* — Jean F Voltaire
(74) *Attorney, Agent, or Firm* — Loza & Loza LLP

(57) ABSTRACT

Aspects of the present disclosure provide for the transmission of various synchronization signals with variable periodicity. For synchronization signals with long periodicity, in some aspects of the disclosure, the synchronization signals may be transmitted as single-frequency-network (SFN) synchronization signals and/or the synchronization signals may be repeated a number (N) of times within a synchronization burst to reduce user equipment (UE) search latency and improve UE measurement accuracy. In some examples, the synchronization signals may be repeated within a synchronization burst using a repetition pattern that may be configurable based on the periodicity of transmission or fixed for one or more periodicities of transmission.

30 Claims, 18 Drawing Sheets

(51) Int. Cl.
*H04L 5/14* (2006.01)
*H04L 27/00* (2006.01)
*H04L 27/26* (2006.01)
*H04W 56/00* (2009.01)
*H04W 88/10* (2009.01)
*H04B 1/69* (2011.01)
*H04W 88/02* (2009.01)
*H04W 88/08* (2009.01)

(52) U.S. Cl.
CPC ............. *H04L 5/0048* (2013.01); *H04L 5/14* (2013.01); *H04L 27/00* (2013.01); *H04L 27/2613* (2013.01); *H04W 56/0085* (2013.01); *H04W 88/10* (2013.01); *H04B 2001/6912* (2013.01); *H04J 11/0076* (2013.01); *H04J 2011/0003* (2013.01); *H04W 56/00* (2013.01); *H04W 56/001* (2013.01); *H04W 88/02* (2013.01); *H04W 88/08* (2013.01)

(58) Field of Classification Search
CPC .. H04W 88/08; H04J 11/0073; H04J 11/0069; H04J 11/0076; H04J 11/00; H04J 2011/0003
USPC .......................................................... 370/350
See application file for complete search history.

(56) References Cited

U.S. PATENT DOCUMENTS

2011/0019605 A1* 1/2011 Ma ........................ H04L 5/0082
370/312
2011/0235560 A1* 9/2011 Kurita .................. G08B 25/007
370/311
2016/0212636 A1* 7/2016 Dimou .................. H04W 48/10

OTHER PUBLICATIONS

Alcatel-Lucent et al., "PBCH Coverage Extension for MTC Devices", R1-130938, 3GPP TSG-RAN WG1 Meeting #72bis, Apr. 1, 2013, XP055261610, Retrieved from the Internet: URL:http://www.3gpp.org [retrieved on Mar. 3, 2016], 4 pages.
International Search Report and Written Opinion—PCT/US2017/056670—ISA/EPO—dated Jan. 12, 2018.
LG Electronics: "Initial procedure and consideration points for the coverage enhancement of MTC UEs", 3GPP Draft; R1-133370 MTC Coverage (Final), 3rd Generation Partnership Project (3GPP), Mobile Competence Centre; 650, Route Des Lucioles ; F-06921 Sophia-Antipolis Cedex ; France, vol. RAN WG1, No. Barcelona, Spain; Aug. 19, 2013-Aug. 23, 2013 Aug. 10, 2013 (Aug. 10, 2013), XP050716484, 6 Pages, Retrieved from the Internet: URL:http://www.3gpp.org/ftp/tsg_ran/WG1_RL 1/TSGR1_74/Docs/ [retrieved on Aug. 10, 2013].
ZTE Corporation, et al., "On Forward Compatibility for New Radio Interface", 3GPP Draft, 3GPP TSG RAN WG1 Meeting #86, R1-166210, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051140118, Retrieved from the Internet: URL:http://www.3gpp.org/ftp/Meetings_3GPP_SYNC/RAN1/Docs/ [retrieved on Aug. 21, 2021], 8 pages.

* cited by examiner

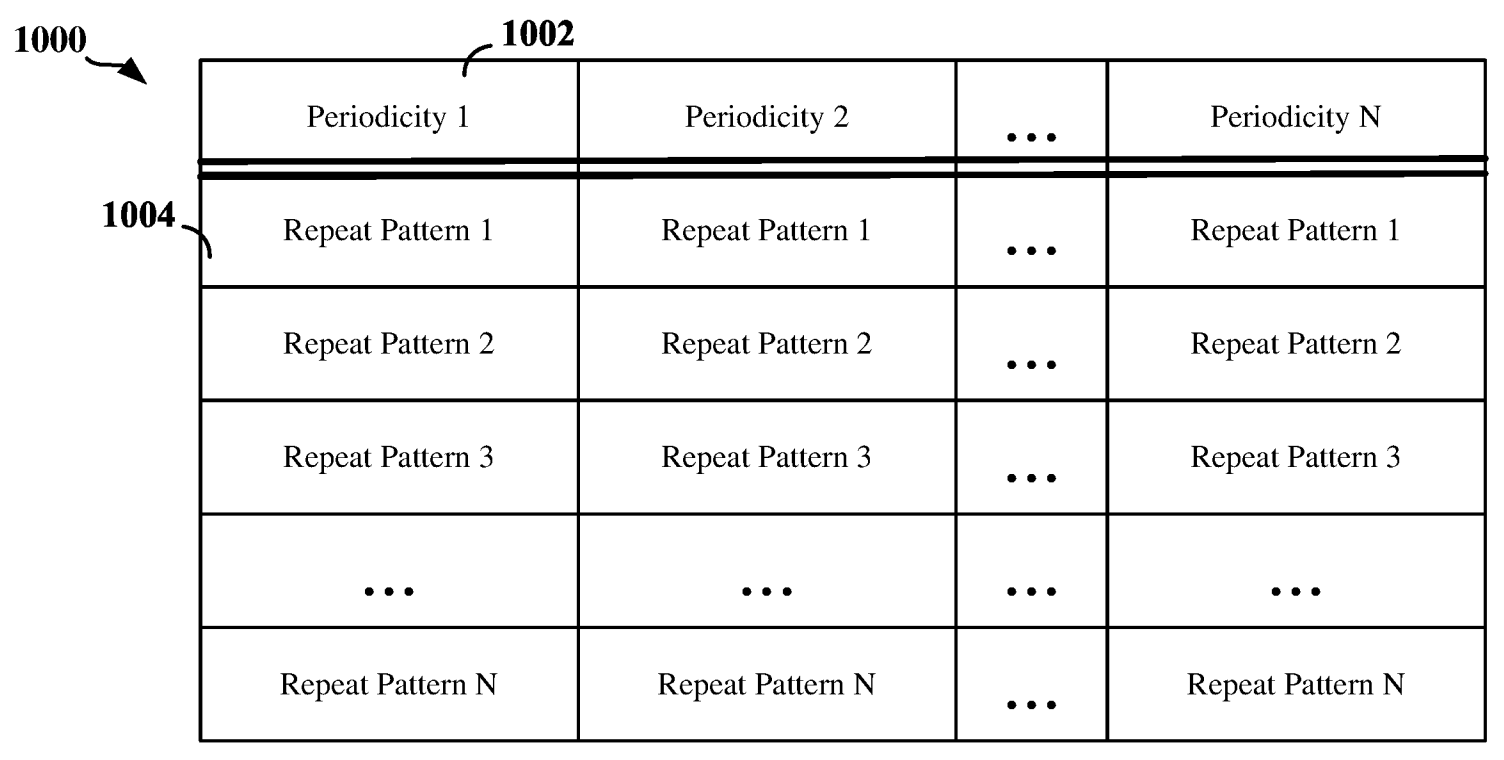

| Periodicity 1 | Periodicity 2 | ... | Periodicity N |
|---|---|---|---|
| Repeat Pattern 1 | Repeat Pattern 1 | ... | Repeat Pattern 1 |
| Repeat Pattern 2 | Repeat Pattern 2 | ... | Repeat Pattern 2 |
| Repeat Pattern 3 | Repeat Pattern 3 | ... | Repeat Pattern 3 |
| ... | ... | ... | ... |
| Repeat Pattern N | Repeat Pattern N | ... | Repeat Pattern N |

FIG. 10

CONFIGURABLE SYNCHRONIZATION IN NEXT GENERATION WIRELESS NETWORKS

PRIORITY CLAIM

This application claims priority to and the benefit of Provisional Patent Application No. 62/409,301 filed in the U.S. Patent and Trademark Office on Oct. 17, 2016, the entire content of which is incorporated herein by reference as if fully set forth below in its entirety and for all applicable purposes.

TECHNICAL FIELD

The technology discussed below relates generally to wireless communication systems, and more particularly, to synchronization in next generation (5G) wireless networks. Embodiments can provide and enable techniques for transmitting synchronization signals with variable periodicity and scrambling physical channels utilizing a zone identifier provided in a synchronization signal.

INTRODUCTION

Mobility management within a wireless communication network is typically implemented using a downlink-based mobility framework in which downlink reference signals are utilized by a user equipment (UE) to select a serving cell to which the UE connects. For example, a UE may receive synchronization signals and system information broadcast by one or more cells and select a serving cell based on the signal strength of the broadcast signals. Once connected to the network through the serving cell, the UE may continue to monitor signals from the serving cell as well as other neighboring cells. If the UE moves from one cell to another, or if the signal quality of a neighboring cell exceeds that of the serving cell for a given amount of time, the UE may undertake a handoff or handover from the serving cell to the neighboring (target) cell. The above-described downlink-based mobility framework places a significant processing burden on the UE to search for neighboring cells, measure the signal strength from neighboring cells and identify a target cell for initial access and/or handover, especially in dense networks with numerous small cells or in high mobility deployments, such as high speed trains.

In next generation (e.g., 5G) wireless communication networks, an uplink-based mobility framework may be available in which uplink reference signals may be utilized by the network to select a serving cell for a UE. The uplink-based mobility framework reduces the amount of processing performed by the UE. However, since the UE may be unaware of the cell selection process and may only have knowledge of a zone that the UE is located in, the identity of the serving cell may not be known by the UE.

Moreover, the periodicity of the transmission of various synchronization signals in next generation wireless communication networks may vary. Such synchronization signals may include, for example, the Primary Synchronization Signal (PSS), Secondary Synchronization Signal (SSS), Physical Broadcast Control Channel (PBCH), and a measurement Reference Signal (MRS). If the UE is unaware of the synchronization signal periodicity, the search latency and resulting UE power consumption may increase, while the UE measurement accuracy may decrease.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to the transmission of various synchronization signals with variable periodicity. For synchronization signals with long periodicity, in some aspects of the disclosure, the synchronization signals may be transmitted as single-frequency-network (SFN) synchronization signals and/or the synchronization signals may be repeated a number (N) of times within a synchronization burst to reduce UE search latency and improve UE measurement accuracy. In some examples, the synchronization signals may be repeated within a synchronization burst using a repetition pattern that may be configurable based on the periodicity of transmission or fixed for one or more periodicities of transmission. In some aspects of the disclosure, the synchronization signals carry the identification of a zone including a plurality of cells. To facilitate paging within the cells of the zone, physical channels carrying paging messages may be scrambled with the zone identifier (ID) instead of the cell identifier.

In some aspects of the disclosure, the cell identifier may be signaled jointly through both long and short periodicity synchronization signals or may be signaled in only the short periodicity synchronization signals. When the cell identifier is provided, physical channels carrying control information, random access responses, and/or user data traffic may be scrambled with the cell identifier. In addition, a base station may switch between transmitting long periodicity synchronization signals and short periodicity synchronization signals based on the state of a UE. For example, when a UE transitions into the Radio Resource Control (RRC)-connected state, the base station may switch from transmitting long periodicity synchronization signals to short periodicity synchronization signals. In some examples, the base station may signal the configuration and allocated resources for the short periodicity synchronization signals to the UE during the RRC connection setup procedure.

In one aspect of the disclosure, a method of wireless communication in a wireless communication network is provided. The method includes transmitting a synchronization signal within a serving cell to enable a user equipment to synchronize communication with the wireless communication network, where the synchronization signal is transmitted with one of a first periodicity or a second periodicity greater than the first periodicity. If the synchronization signal is transmitted with the second periodicity, the method further includes repeating the synchronization signal within a synchronization burst based on a repetition pattern associated with the second periodicity.

Another aspect of the disclosure provides an apparatus in a wireless communication network. The apparatus includes a processor, a transceiver communicatively coupled to the processor, and a memory communicatively coupled to the processor. The processor is configured to transmit a synchronization signal within a serving cell to enable a user equipment to synchronize communication with the wireless communication network, where the synchronization signal is transmitted with one of a first periodicity or a second periodicity greater than the first periodicity If the synchronization signal is transmitted with the second periodicity, the processor is further configured to repeat the synchronization signal within a synchronization burst based on a repetition pattern associated with the second periodicity.

Another aspect of the disclosure provides an apparatus in a wireless communication network. The apparatus includes means for transmitting a synchronization signal within a serving cell to enable a user equipment to synchronize communication with the wireless communication network, where the synchronization signal is transmitted with one of a first periodicity or a second periodicity greater than the first periodicity. If the synchronization signal is transmitted with the second periodicity, the apparatus further includes means for repeating the synchronization signal within a synchronization burst based on a repetition pattern associated with the second periodicity.

Examples of additional aspects of the disclosure follow. In some aspects of the present disclosure, the repetition pattern may be selected from a set of two or repetition patterns associated with the second periodicity. In some aspects of the disclosure, the synchronization signal is a single-frequency-network synchronization signal.

In some aspects of the disclosure, the synchronization signal includes a zone identifier of a zone including a plurality of cells, where the plurality of cells includes the serving cell. In some examples, a physical channel carrying a paging message may then be scrambled with the zone identifier and transmitted to the user equipment.

If the synchronization signal is transmitted with the first periodicity, a cell identifier of the serving cell may be included within the synchronization signal. In addition, a physical channel may be scrambled with the cell identifier and transmitted to the user equipment. For example, the physical channel may include control information, a random access response, or user data traffic.

If the synchronization signal is transmitted with both the first periodicity and the second periodicity, a first portion of a cell identifier of the serving cell may be included within the synchronization signal transmitted with the first periodicity and a second portion of the cell identifier may be included within the synchronization signal transmitted with the second periodicity. The first portion of the cell identifier and the second portion of the cell identifier are non-overlapping.

In some examples, the apparatus may switch from the second periodicity to the first periodicity when the user equipment transitions into a connected state. In this example, the apparatus may further transmit configuration information for the synchronization signal with the first periodicity to the user equipment during the transition into the connected state.

In some aspects of the present disclosure, the serving cell supports a first radio access technology and a second radio access technology different than the first radio access technology. A static periodicity of transmission of synchronization signals may be identified for the first radio access technology within the serving cell, and a configurable periodicity of transmission of synchronization signals may be selected for the second radio access technology within the serving cell based on the static periodicity of transmission, where the configurable periodicity of transmission is different than the static periodicity of transmission.

Another aspect of the disclosure provides a method of wireless communication in a wireless communication network. The method includes receiving a synchronization signal within a serving cell at a user equipment to enable the user equipment to synchronize communication with the wireless communication network, where the synchronization signal is transmitted with one of a first periodicity or a second periodicity greater than the first periodicity. If the synchronization signal is transmitted with the second periodicity, the method further includes receiving at least one repetition of the synchronization signal within a synchronization burst based on a repetition pattern associated with the second periodicity.

Examples of additional aspects of the disclosure follow. In some aspects of the disclosure, the synchronization signal includes a first synchronization signal and a second synchronization signal. The user equipment may search for the first synchronization signal within a serving cell, where the first synchronization signal is transmitted with the first periodicity. The user equipment may then synchronizing communication with the wireless communication network utilizing the first synchronization signal, and receive the second synchronization signal within the serving cell, where the second synchronization signal is transmitted with the second periodicity. The user equipment may then camp on the serving cell utilizing the second synchronization signal.

In some aspects of the disclosure, the user equipment may utilize the first synchronization signal to perform an initial acquisition or a neighbor cell search, and utilize the second synchronization signal for frequency and time refinement when performing a mobility measurement. In some aspects of the disclosure, the user equipment may receive the second synchronization signal with the second periodicity in an idle state, and receiving the second synchronization signal with a third periodicity less than the second periodicity in a connected state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 is a diagram illustrating a table of repetition patterns and synchronization signal transmission periodicities according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
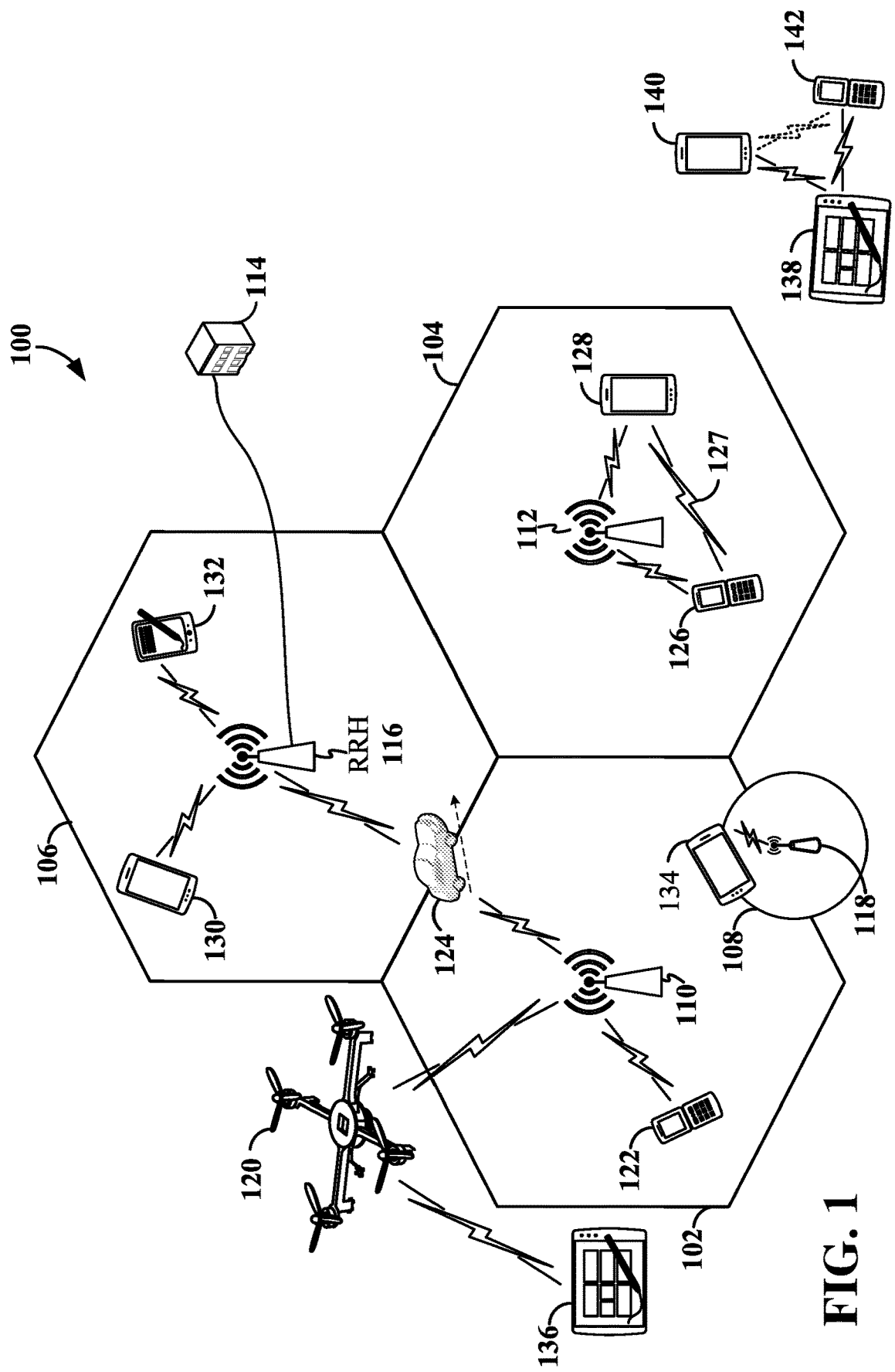
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a next generation (e.g., fifth generation (5G)) access network or a legacy (3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 2:
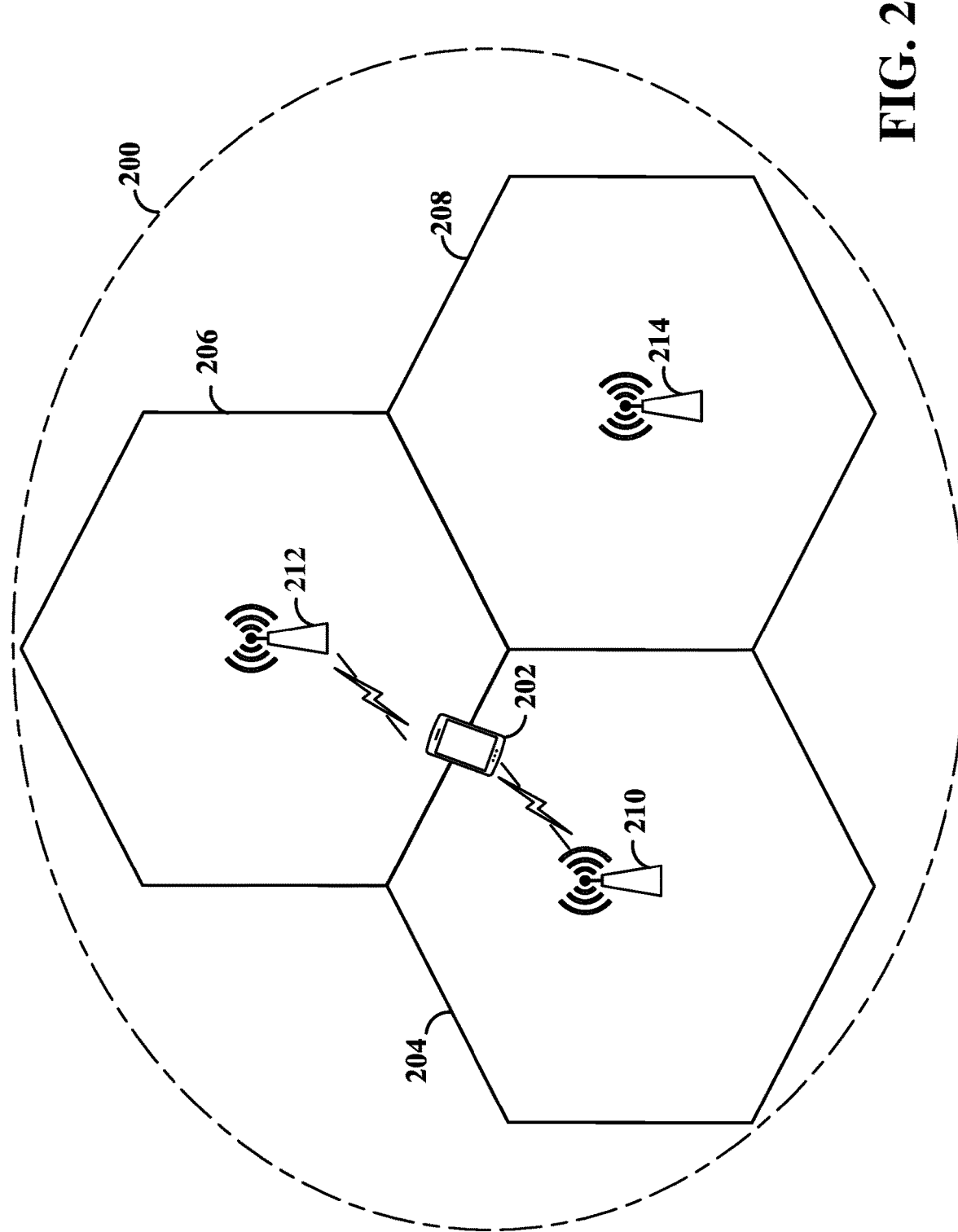
FIG. 2 is a diagram illustrating an example of a zone of cells according to some aspects of the present disclosure.

FIG. 2 is a diagram illustrating a network zone 200 including a plurality of cells 204, 206, and 208. Each of the cells 204, 206, and 208 is served by a respective base station 210, 212, and 214. The network zone 200 may be a zone associated with at least a portion of the access network 100 described in FIG. 1. As used herein, the term "zone" refers to a group or combination of cells that function in a coordinated manner and are highly synchronized. As a result of the coordinated operation of the cells in a zone, the synchronization signals are zone-specific. That is, the synchronization signals transmitted (e.g., broadcast) from the zone 200 are typically single-frequency network (SFN) synchronization signals. As further used herein, the term "single-frequency network" refers to a broadcast network where several transmitters simultaneously send the same signal over the same frequency channel.

The synchronization signals may include, for example, Primary Synchronization Signals (PSSs), Secondary Synchronization Signals (SSSs), Physical Broadcast Channels (PBCH), and measurement Reference Signals (MRS). The PSS and SSS may provide timing and frequency synchronization information, along with the zone ID (or cell ID if the synchronization signals are not SFN-synchronization signals). The PBCH may include, for example, the Master Information Block (MIB), which may include essential system information for use in obtaining the minimum system information delivered by the PDCCH/PDSCH necessary for performing random access.

In the example shown in FIG. 2, a UE 202 is located in an overlapping area or region between the network cells 204 and 206. Thus, the UE 202 in the overlapping area may receive unified synchronization signals from base stations 210 and 212. For example, base station 210 may generate and transmit (e.g., broadcast), unified synchronization signals, which may include a zone identifier for the network zone 200, as well as a nominal tone spacing being used by zone 200. Similarly, base station 212 may transmit (e.g., broadcast) the same unified synchronization signals that identify zone 200.

After receiving the unified synchronization signals, the UE 202 in the overlapping area may process the unified synchronization signals to synchronize communication with the zone 200 using the nominal tone spacing. The UE 202 may then transmit a pilot or reference signal, which may be concurrently received by base stations 210 and 212 within the zone 200. Each of the base stations 210 and 212 may measure a strength of the pilot signal, and the zone 200 (e.g., one or more of the base stations 210 and 212 and/or a central node within the core network (not shown)) may determine the serving cell for the UE 202. For example, the serving cell may be cell 206.

As described above, the unified synchronization signals identify the zone, but may not identify the cell from which the signal is transmitted. There may be situations, however, where the UE 202 requires knowledge of the cell identifier of a serving cell. In some examples, the downlink channels (e.g., Physical Downlink Control Channel (PDCCH) and Physical Downlink Shared Channel (PDSCH)) utilized to carry control information and user data traffic to the UE 202 may be scrambled using the cell identifier of the serving cell 206.

For example, when the UE 202 has user data traffic to transmit to the base station 210, the UE 202 may transmit a random access request to set up a connection with the base station 210. The base station 210 may then assign uplink resources to the UE 202 and transmit the uplink resource assignment information to the UE 202 on the PDCCH scrambled with the cell identifier. The base station 210 may further transmit a random access response to the UE 202 on the PDSCH scrambled with the cell identifier.

Similarly, when the base station 210 has user data traffic to be transmitted to the UE 202, the base station 210 may page the UE 202 using, for example, a Keep Alive message. Upon receiving a response from the UE 202, the base station 210 may allocate downlink resources to the UE 202 for the downlink transmission and transmit the allocated downlink resource information to the UE 202 on the PDCCH scrambled with the cell identifier. The downlink user data traffic may then be transmitted by the base station 210 on the PDSCH scrambled with the cell identifier.

In some aspects of the present disclosure, in order to demodulate the PDCCH and PDSCH, the UE may be provided with the cell identifier of the serving cell 206 prior to receiving the PDCCH and/or PDSCH. For example, the cell identifier may be signaled through the synchronization signals using a traditional downlink-based mobility framework or an uplink-based mobility framework. In other aspects of the present disclosure, the PDCCH and/or PDSCH may be scrambled with the zone identifier instead of the cell identifier to enable the UE 202 to demodulate the PDCCH and/or PDSCH.

In addition, various aspects of the present disclosure enable the transmission of synchronization signals with variable periodicity. For synchronization signals with long periodicity, the synchronization signals may be transmitted as single-frequency-network (SFN) synchronization signals within an uplink-based mobility network and/or the synchronization signals may be repeated a number (N) of times within a synchronization burst within an uplink-based mobility network or a downlink-based mobility network to reduce UE search latency and improve UE measurement accuracy. In some examples, the synchronization signals may be repeated within a synchronization burst using a repetition pattern that may be configurable based on the periodicity of transmission or fixed for one or more periodicities of transmission.

Figure 3:
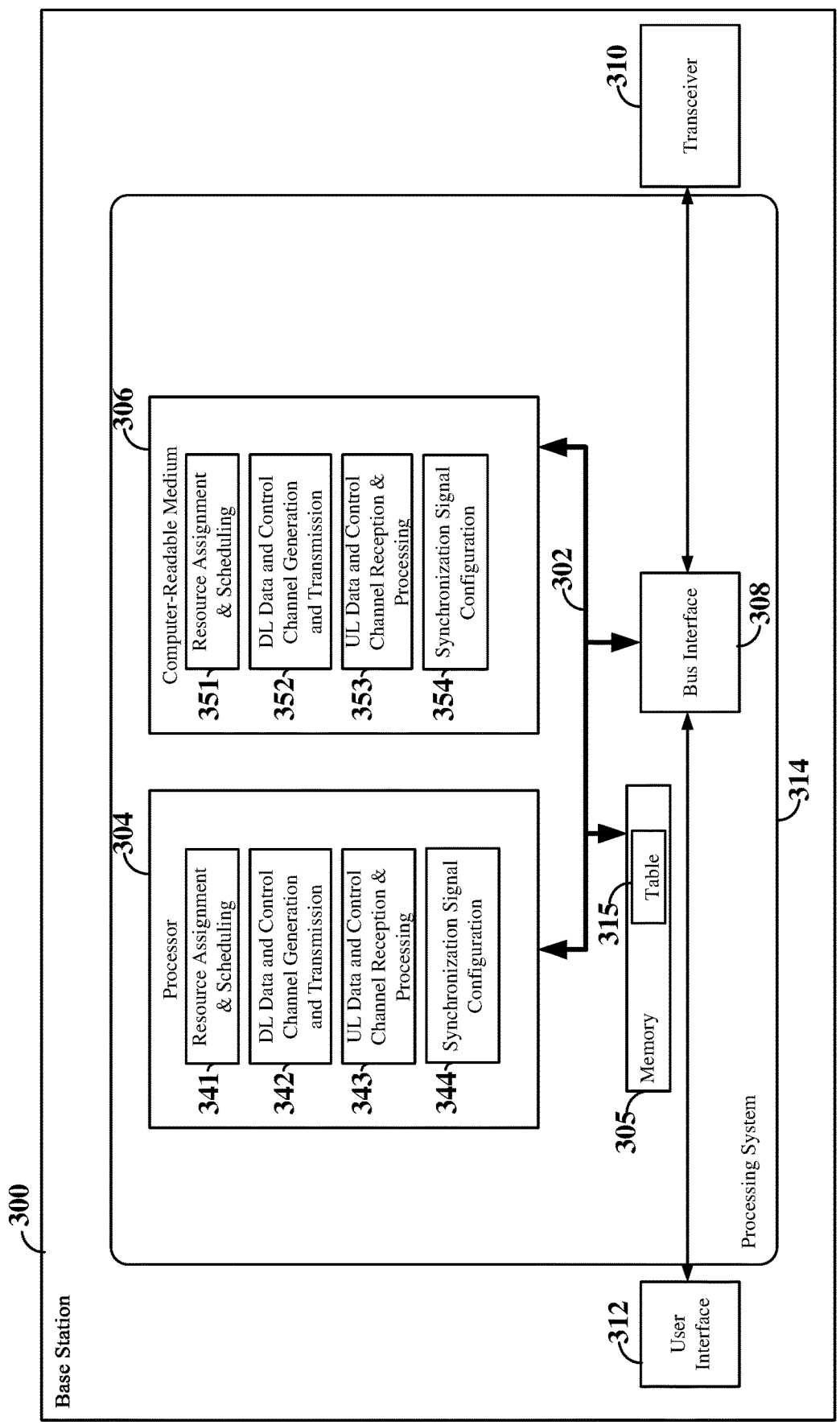
FIG. 3 is a block diagram illustrating an example of a hardware implementation for a base station employing a processing system according to some aspects of the present disclosure.

FIG. 3 is a conceptual diagram illustrating an example of a hardware implementation for an exemplary base station 300 employing a processing system 314. For example, the base station 300 may be a next generation (5G) base station as illustrated in any one or more of FIGS. 1 and 2.

The base station 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 300 may be configured to perform any one or more of the functions described herein. That is, the processor 304, as utilized in a base station 300, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium (e.g., air interface). Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include resource assignment and scheduling circuitry 341, configured to generate, schedule, and modify a resource assignment or grant of time-frequency resources. For example, the resource assignment and scheduling circuitry 341 may schedule time-frequency resources within a plurality of time division duplex (TDD) and/or frequency division duplex (FDD) subframes or slots to carry user data traffic and/or control information to and/or from multiple UEs. The resource assignment and scheduling circuitry 341 may further operate in coordination with resource assignment and scheduling software 351.

The processor 304 may further include downlink (DL) traffic and control channel generation and transmission circuitry 342, configured to generate and transmit downlink user data traffic and control channels within one or more subframes or slots. The DL traffic and control channel generation and transmission circuitry 342 may operate in coordination with the resource assignment and scheduling circuitry 341 to place the DL user data traffic and/or control information onto a time division duplex (TDD) or frequency division duplex (FDD) carrier by including the DL user data traffic and/or control information within one or more subframes or slots in accordance with the resources assigned to the DL user data traffic and/or control information.

In various aspects of the present disclosure, the DL traffic and control channel generation and transmission circuitry 342 may be configured to generate synchronization signals of variable periodicity. The synchronization signals may include, for example, Primary Synchronization Signals (PSSs), Secondary Synchronization Signals (SSSs), Physical Broadcast Channels (PBCH), and measurement Reference Signals (MRS). In some examples, the MRS is optional and one or both of the PSS or SSS may be used as a reference signal.

In some examples, the synchronization signals may be transmitted with long periodicity (e.g., 200 ms), with short periodicity (e.g., 5 ms) or other suitable periodicity. In addition, the periodicity may vary between types of synchronization signals. For example, the PSS may have a first periodicity, while the SSS may have a second periodicity different than the first periodicity. The long periodicity may be utilized, for example, for UEs that are in a Radio Resource Control (RRC)-idle state, whereas the short periodicity may be utilized, for example, for UEs that are in an RRC-connected state (e.g., active or inactive). In some aspects of the present disclosure, if there are no UEs in the RRC-connected state, the DL traffic and control channel generation and transmission circuitry 342 may transmit synchronization signals with only the long periodicity to reduce power consumption.

In some examples, the DL traffic and control channel generation and transmission circuitry 342 may further be configured to generate and transmit the synchronization signals that carry only the zone identifier (not the cell identifier). In other examples, the DL traffic and control channel generation and transmission circuitry 342 may be configured to generate and transmit synchronization signals that carry a cell identifier in addition to or in lieu of a zone identifier. In some examples, the synchronization signals with short periodicity, as may be transmitted within a downlink-based mobility network, may carry the cell identifier. In other examples, the cell identifier (ID) may be jointly signaled in both long periodicity synchronization signals and short periodicity synchronization signals.

In some examples, the DL traffic and control channel generation and transmission circuitry 342 may further be configured to generate a Keep Alive message (e.g., paging message) for a particular UE to indicate the base station has user data traffic to be transmitted to the UE. In various aspects of the present disclosure, the DL traffic and control channel generation and transmission circuitry 342 may be configured to transmit the paging message within a physical downlink control channel (PDCCH) (or Enhanced PDCCH (ePDCCH)) or a physical downlink shared channel (PDSCH) (or Enhanced PDSCH (ePDSCH)). The PDCCH or PDSCH carrying the paging message may further be scrambled using the zone identifier of the zone associated with the base station 300.

The DL traffic and control channel generation and transmission circuitry 342 may further be configured to generate a communication related to the user data traffic to be transmitted. For example, the DL traffic and control channel generation and transmission circuitry 342 may be configured to generate a physical downlink control channel (PDCCH) (or Enhanced PDCCH (ePDCCH)) including downlink control information (DCI). In some examples, the DCI may include an assignment of downlink resources for the user data traffic. In addition, the DL traffic and control channel generation and transmission circuitry 342 may further be configured to generate a physical downlink shared channel (PDSCH) (or Enhanced PDSCH (ePDSCH)) including the downlink user data traffic.

In some examples, the DL traffic and control channel generation and transmission circuitry 342 may further be configured to generate a PDCCH including control information (DCI) indicating a grant of uplink resources for a particular UE in response to receiving a random access request. In addition, the DL traffic and control channel generation and transmission circuitry 342 may further be configured to generate a PDSCH including a random access response to the random access request received from a particular UE.

In some examples, the DL traffic and control channel generation and transmission circuitry 342 may further scramble the PDCCH carrying DCI and/or the PDSCH carrying downlink user data traffic and/or random access responses with either the zone identifier of the zone within which the base station 300 is located or the cell identifier of the cell served by the base station 300. The DL traffic and control channel generation and transmission circuitry 342 may further operate in coordination with DL traffic and control channel generation and transmission software 352.

The processor 304 may further include uplink (UL) traffic and control channel reception and processing circuitry 343, configured to receive and process uplink control channels and uplink traffic channels from one or more UEs. For example, the UL traffic and control channel reception and processing circuitry 343 may be configured to receive random access requests from one or more UEs, where the random access requests are configured to request a grant of time-frequency resources for uplink user data traffic transmissions. In general, the UL traffic and control channel reception and processing circuitry 343 may operate in coordination with the resource assignment and scheduling circuitry 341 to schedule UL user data traffic transmissions, DL user data traffic transmissions and/or DL user data traffic retransmissions in accordance with the received UL information. The UL traffic and control channel reception and processing circuitry 343 may further operate in coordination with UL traffic and control channel reception and processing software 353.

The processor 304 may further include synchronization signal configuration circuitry 344, configured to determine a synchronization signal transmission configuration for use by the DL traffic and control channel generation and transmission circuitry 342. In some aspects of the present disclosure, the synchronization signal configuration circuitry 344 may configure the transmission of synchronization signals with long periodicity (e.g., when all UEs within the cell served by the base station 300 are in the RRC-idle state). In some examples, the synchronization signals may be transmitted as single-frequency-network (SFN) synchronization signals and/or the synchronization signals may be repeated a number (N) of times within a synchronization burst to reduce UE search latency and improve UE measurement accuracy. In some examples, the synchronization signals may be repeated within a synchronization burst using a repetition pattern that may be either configurable based on the periodicity of transmission or fixed for one or more periodicities of transmission. A table 315 maintained, for example, in memory 305 may store available periodicities of transmission and associated repetition patterns.

For example, the periodicity of transmission may be configurable, but each periodicity may have only a single respective repetition pattern. As another example, the periodicity of transmission may be configurable and each periodicity may have one or more repetition patterns to select from. As yet another example, the periodicity of transmission may be configurable, but all periodicities may have the same repetition pattern. As a further example, the periodicity of transmission may be fixed, but the repetition pattern may be configurable (e.g., the synchronization signal configuration circuitry 344 may select from two or more repetition patterns). As still a further example, both the periodicity of transmission and repetition pattern may be fixed (e.g., only a single periodicity and a single repetition pattern may be utilized for transmission of synchronization signals).

In some aspects of the disclosure, the synchronization signal configuration circuitry 344 may configure the synchronization signals to be transmitted with long periodicity when all UEs within the cell are in the RRC-idle state. The synchronization signal configuration circuitry 344 may further configure the long periodicity synchronization signals to carry only the zone identifier (not the cell identifier). In an aspect of the present disclosure, the synchronization signal configuration circuitry 344 may further instruct the DL traffic and control channel generation and transmission circuitry 342 to scramble the PDCCH and/or PDSCH carrying a paging message with the zone identifier to enable UEs within the cell served by the base station 300 to demodulate the PDCCH and/or PDSCH, as described above.

In some aspects of the disclosure, the synchronization signal configuration circuitry 344 may configure one or more of the synchronization signals to carry a cell identifier in addition to or in lieu of a zone identifier. In some examples, the synchronization signal configuration circuitry 344 may configure the synchronization signals with short periodicity to carry the cell identifier. In other examples, the synchronization signal configuration circuitry 344 may configure the synchronization signals such that the cell identifier (ID) is jointly signaled in both long periodicity synchronization signals and short periodicity synchronization signals. In an aspect of the disclosure, the long periodicity synchronization signals may include the four most significant bits (MSBs) of the cell ID, while the short periodicity synchronization signals may include the six least significant bits (LSBs) of the cell ID. That is, the combination of long and short periodicity synchronization signals may carry ten bits for the cell ID.

In some aspects of the disclosure, the synchronization signal configuration circuitry 344 may further switch between transmitting long periodicity synchronization signals and short periodicity synchronization signals based on the state of a UE. For example, when a UE transitions into the Radio Resource Control (RRC)-connected state from the RRC-idle state (e.g., as may be detected by the UL traffic and control channel reception and processing circuitry 343), the synchronization signal configuration circuitry 344 may switch from transmitting long periodicity synchronization signals to transmitting short periodicity synchronization signals. In some examples, the synchronization signal configuration circuitry 344 may instruct the DL data and control channel generation and transmission circuitry 342 to transmit configuration information indicating the configuration and allocated resources (time-frequency resources) for the short periodicity synchronization signals to the UE during the RRC connection setup procedure.

In some aspects of the disclosure, the synchronization signal configuration circuitry 344 may determine that the base station 300 supports at least dual carriers (e.g., at least dual radio access technologies (RATs)). For example, one of the RATs may be a legacy RAT, while another RAT may be a next generation RAT. The synchronization signal configuration circuitry 344 may further determine the periodicity of transmission of synchronization signals for the legacy RAT and select a periodicity of transmission of synchronization signals for the next generation RAT accordingly. In some examples, the legacy RAT may send synchronization signals with a short periodicity of transmission. In this example, the synchronization signal configuration circuitry 344 may utilize a configurable long periodicity (e.g., 40 ms, 80 ms, or 200 ms) for transmission of synchronization signals for the next generation RAT. The synchronization signal configuration circuitry 344 may further operate in coordination with synchronization signal configuration software 354.

Figure 4:
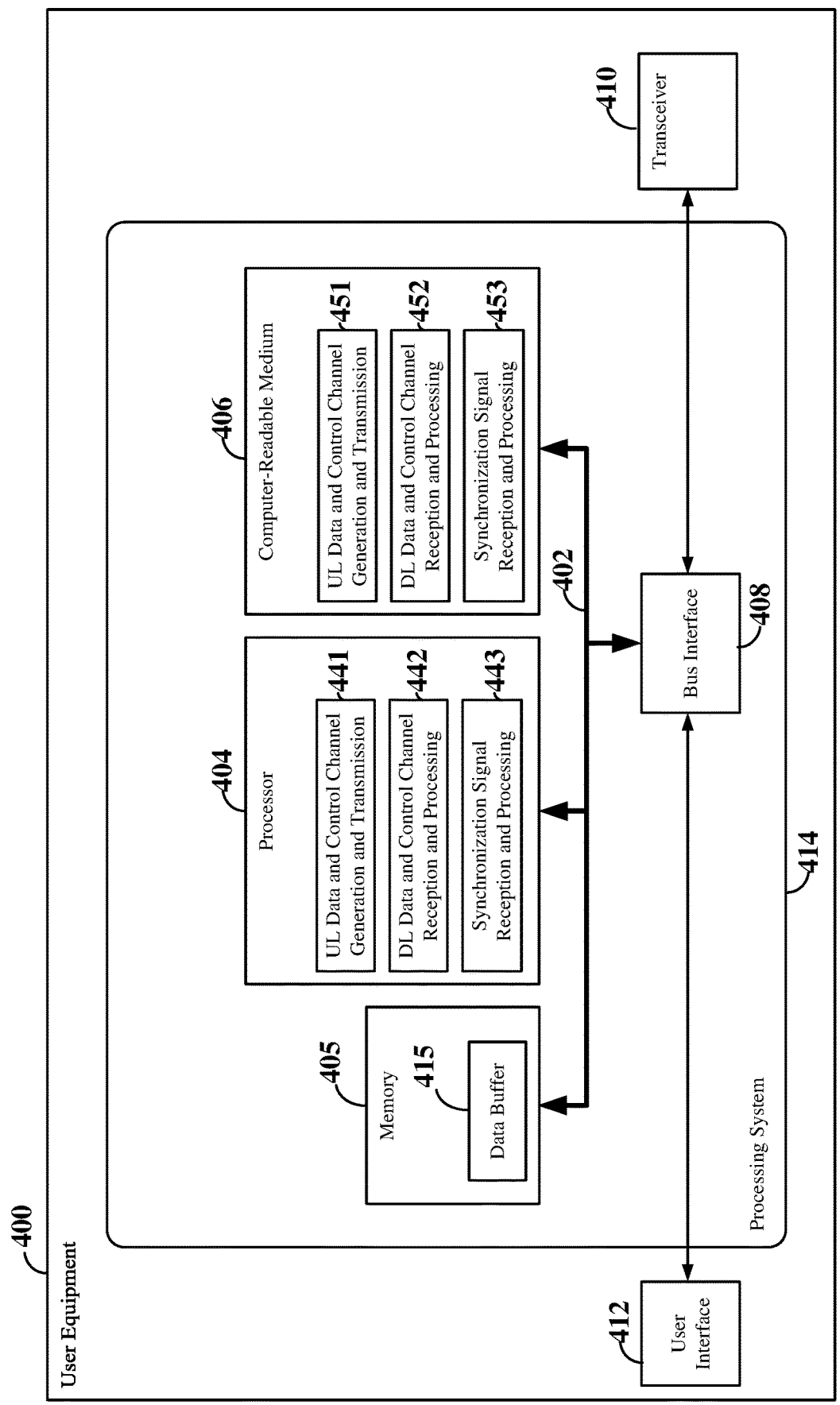
FIG. 4 is a diagram illustrating an example of a hardware implementation for a user equipment (UE) employing a processing system according to some aspects of the present disclosure.

FIG. 4 is a conceptual diagram illustrating an example of a hardware implementation for an exemplary UE 400 employing a processing system 414. For example, the UE 400 may be a UE as illustrated in any one or more of FIGS. 1 and 2.

The processing system 414 may be substantially the same as the processing system 314 illustrated in FIG. 3, including a bus interface 408, a bus 402, memory 405, a processor 404, and a computer-readable medium 406. Furthermore, the UE 400 may include a user interface 412 and a transceiver 410 substantially similar to those described above in FIG. 3. That is, the processor 404, as utilized in a UE 400, may be used to implement any one or more of the processes described below.

In some aspects of the disclosure, the processor 404 may include uplink (UL) traffic and control channel generation and transmission circuitry 442, configured to generate and transmit uplink user data traffic on an UL traffic channel, and to generate and transmit uplink control/feedback/acknowledgement information on an UL control channel. For example, the UL traffic and control channel generation and transmission circuitry 442 may be configured to generate and transmit a random access request indicating the UE 400 has uplink user data traffic to transmit. The UL traffic and control channel generation and transmission circuitry 442 may further be configured to generate a pilot (or reference) signal to enable the network to select a serving cell/base station for the UE. The UL traffic and control channel generation and transmission circuitry 442 may operate in coordination with UL traffic and control channel generation and transmission software 452.

The processor 404 may further include downlink (DL) traffic and control channel reception and processing circuitry 444, configured for receiving and processing downlink user data traffic on a DL traffic channel, and to receive and process control information on one or more DL control channels. For example, the DL traffic and control channel reception and processing circuitry 444 may be configured to receive downlink control information (DCI) indicating an assignment of downlink resources or a grant of uplink resources within a PDCCH, system information or a random access response within a PDSCH and downlink user data traffic within a PDSCH. In some examples, the received downlink user data traffic and/or control information may be temporarily stored in a data buffer 415 within memory 405.

The processor 404 may further include synchronization signal reception and processing circuitry 446, configured to receive synchronization signals from a cell or a zone of cells and process the synchronization signals to synchronize communication with the zone/cell. In some examples, the synchronization signals may have a short periodicity of transmission or a long periodicity of transmission. Long periodicity synchronization signals may further be SFN-synchronization signals and/or be repeated a number (N) of times within a synchronization burst to reduce synchronization latency and facilitate accurate measurements. The periodicity and repetition pattern of the synchronization signals may be included in the synchronization signals or the synchronization signal reception and processing circuitry 446 may perform blind detection over various periodicity configurations and repetition patterns.

When transitioning from the RRC-idle state to the RRC-connected state, the periodicity of transmission may switch from long periodicity to short periodicity. In this example, the synchronization signal reception and processing circuitry 446 may receive the configuration and allocated resources for the short periodicity synchronization signals during the RRC connection setup procedure.

The synchronization signal reception and processing circuitry 446 may further extract the cell ID from one or more synchronization signals of one or more periodicities and provide the cell ID to the DL traffic and control channel reception and processing circuitry 444 for demodulation of PDCCH and/or PDSCH signals scrambled with the cell ID.

When the network has deployed two or more carriers (e.g., two or more RATs) within a serving cell, the synchronization signal reception and processing circuitry 446 may search for the shortest synchronization signal periodicity (e.g., a legacy RAT) during the initial acquisition or neighbor cell search process. The synchronization signal reception and processing circuitry 446 may then camp on the serving cell using a longer (or configurable) periodicity (e.g., next generation RAT) in the idle state for frequency and time refinement during the mobility measurement process. As discussed above, the next generation RAT may send denser synchronization signals (e.g., shorter periodicity synchronization signals) when the UE transitions into the RRC-connected state. The synchronization signal reception and processing circuitry 446 may further operate in coordination with synchronization signal reception and processing software 456.

Figure 5:
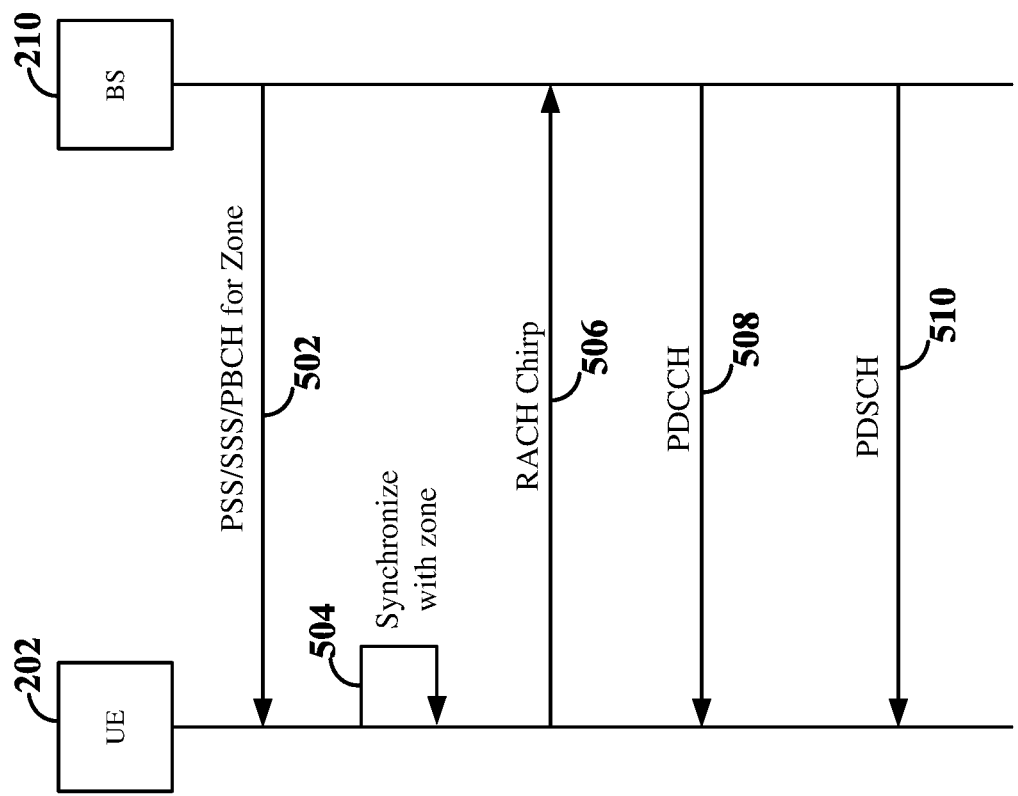
FIG. 5 is a signaling diagram illustrating exemplary signaling for performing a random access procedure with a serving base station according to some aspects of the present disclosure.

FIG. 5 is a signaling diagram illustrating exemplary signaling for a UE 202 to perform a random access procedure with a serving base station (BS) 210 according to some embodiments. The UE 202 may correspond, for example, to any of the UEs illustrated in FIGS. 1, 2, and/or 4. The BS 210 may correspond, for example, to any of the base stations illustrated in FIGS. 1, 2, and/or 3.

In the example, shown in FIG. 5, at 502, the UE 202 may first receive synchronization signals from a BS 210. For example, upon powering on, the UE 202 may listen to synchronization and/or broadcast channels to obtain the synchronization information necessary for initial access to the network. Examples of synchronization information include, but are not limited to, one or more of downlink system bandwidth/carrier frequency, a Physical Hybrid ARQ Indicator Channel structure, the most significant eight-bits of the System Frame Number, a master information block (MIB), etc. In some examples, the synchronization and/or broadcast channels may include the Primary Synchronization Signal (PSS), the Secondary Synchronization Signal (SSS), and/or the Physical Broadcast Channel (PBCH). In some examples, the synchronization signals are traditional synchronization signals transmitted within a downlink-based mobility network. In other examples, the synchronization signals may be unified synchronization signals (e.g., single-frequency-network synchronization signals) transmitted within a zone.

Upon receiving the synchronization signals from the BS 210, at 504, the UE 202 may acquire timing of the cell or zone and synchronize communication with the cell or zone. At 506, when the UE 202 detects the presence of user data traffic to be transmitted to the BS 210, the UE 202 may transmit a random access request. For example, the UE 202 may generate and transmit a chirp signal including a random access chirp purpose indicator to request uplink resources to transmit the user data traffic.

Upon receiving the random access request, at 508, the BS 210 may transmit a PDCCH including a grant of uplink resources for transmission of the user data traffic, and at 510, the BS 210 may transmit a PDSCH including a random access response. In some examples, the PDCCH and/or PDSCH (e.g., the random access response) may be scrambled using the cell identifier. The cell identifier may be included, for example, in the PSS and/or SSS transmitted at 602. In other examples, the PDCCH and/or PDSCH (e.g., the random access response) may be scrambled using the zone identifier. The zone identifier may be included, for example, in the PSS and/or SSS transmitted at 602. The UE 202 may then utilize the cell identifier or zone identifier to demodulate the PDCCH and PDSCH.

Figure 6:
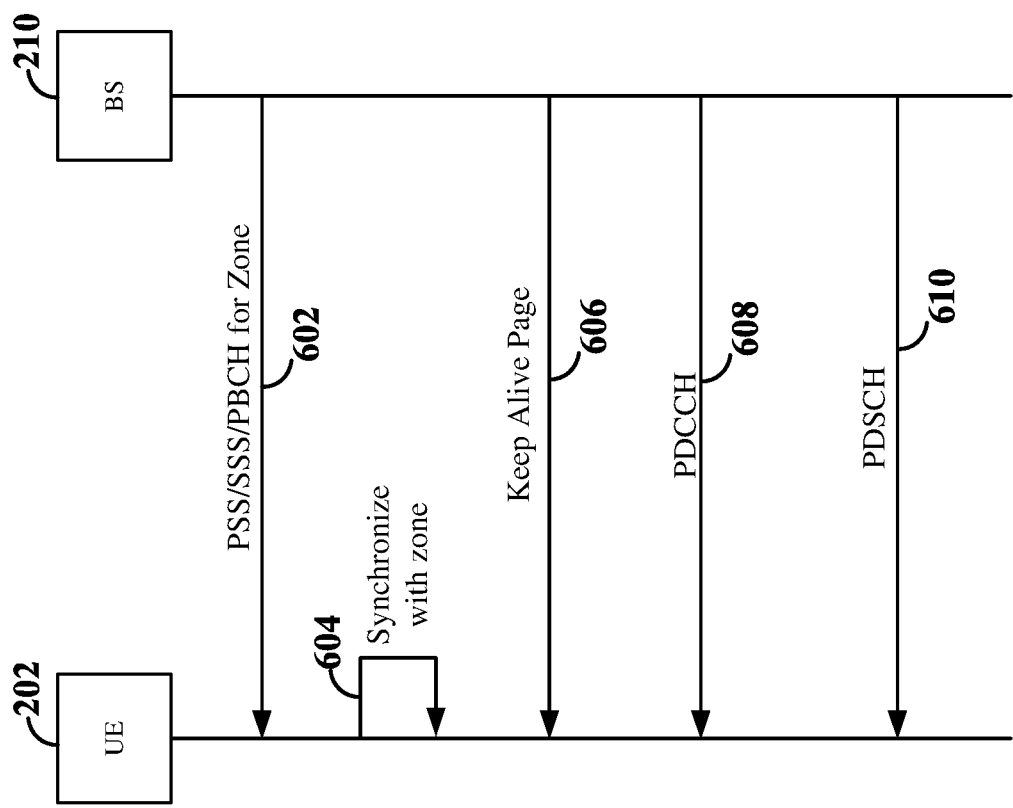
FIG. 6 is a signaling diagram illustrating exemplary signaling for paging and transmitting user data traffic to a UE from a serving base station according to some aspects of the present disclosure.

FIG. 6 is a signaling diagram illustrating exemplary signaling for a base station (BS) 210 to page and transmit user data traffic to a UE 202 according to some embodiments. The UE 202 may correspond, for example, to any of the UEs illustrated in FIGS. 1, 2, and/or 4. The BS 210 may correspond, for example, to any of the base stations illustrated in FIGS. 1, 2, and/or 3.

In the example, shown in FIG. 6, at 602, the UE 202 may first receive synchronization signals from a BS 210. For example, upon powering on, the UE 202 may listen to synchronization and/or broadcast channels to obtain the synchronization information necessary for initial access to the network. Examples of synchronization information include, but are not limited to, one or more of downlink system bandwidth/carrier frequency, a Physical Hybrid ARQ Indicator Channel structure, the most significant eight-bits of the System Frame Number, a master information block (MIB), etc. In some examples, the synchronization and/or broadcast channels may include the Primary Synchronization Signal (PSS), the Secondary Synchronization Signal (SSS), and/or the Physical Broadcast Channel (PBCH). In some examples, the synchronization signals are traditional synchronization signals transmitted within a downlink-based mobility network. In other examples, the synchronization signals may be unified synchronization signals (e.g., single-frequency-network synchronization signals) transmitted within a zone.

Upon receiving the synchronization signals from the BS 210, at 604, the UE 202 may acquire timing of the cell or zone and synchronize communication with the cell or zone. At 606, the BS 210 may detect the presence of downlink user data traffic to be transmitted to the UE 202 and transmit a Keep Alive (e.g., paging) message to the UE indicating the presence of the downlink user data traffic. In various aspects of the present disclosure, the paging message may be transmitted within a PDCCH (for PDSCH scheduling) or a PDSCH. The PDCCH or PDSCH carrying the paging message may be scrambled using the zone identifier of the zone or cell identifier of the cell. The zone identifier and/or cell identifier may be included, for example, in the PSS and/or SSS transmitted at 602.

Upon detecting the downlink user data traffic and transmitting the Keep Alive page message, at 608, the BS 210 may then transmit a PDCCH including an assignment of resources for the downlink user data traffic, and at 610, transmit a PDSCH including the downlink user data traffic. In some examples, the PDCCH and/or PDSCH may be scrambled using the cell identifier or zone identifier. The cell identifier or zone identifier may be included, for example, in the PSS and/or SSS transmitted at 602. The UE 202 may then utilize the cell identifier or zone identifier to demodulate the PDCCH and PDSCH.

Figure 7:
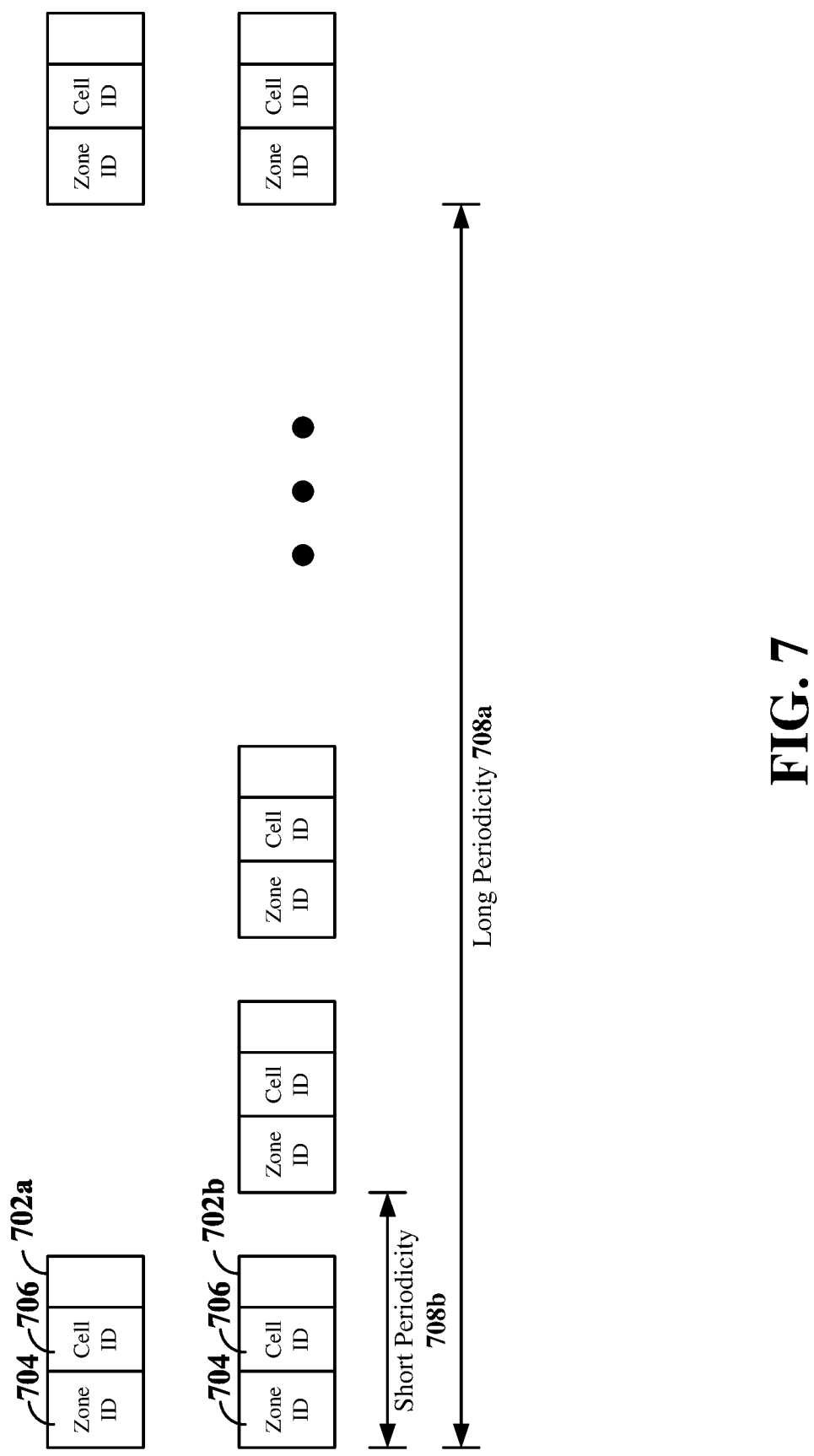
FIG. 7 is a diagram illustrating the transmission of synchronization signals with various periodicities according to some aspects of the present disclosure.

FIG. 7 is a diagram illustrating the transmission of synchronization signals 702a and 702b with various periodicities according to some aspects of the present disclosure. Each of the synchronization signals 702a and 702b may include one or more of the Primary Synchronization Signal (PSS), the Secondary Synchronization Signal (SSS), and/or the Physical Broadcast Channel (PBCH). Synchronization signal 702a is transmitted with a long periodicity 708a (e.g., measured between the beginning of one synchronization signal and the beginning of the next synchronization signal), while synchronization signal 702b is transmitted with a short periodicity 708b (e.g., measured between the beginning of one synchronization signal and the beginning of the next synchronization signal). In some examples, the long periodicity may be 200 ms or other suitable periodicity (e.g., 40 ms or 80 ms), and the short periodicity may be 5 ms or other suitable periodicity shorter than the long periodicity.

In various aspects of the disclosure, one or both of the long and short periodicity synchronization signals 702a and 702b may be transmitted within a particular cell. For example, the long periodicity synchronization signal 702a may be utilized for UEs that are in a Radio Resource Control (RRC)-idle state, whereas the short periodicity synchronization signal 702b may be utilized for UEs that are in an RRC-connected state (e.g., active or inactive). In some aspects of the present disclosure, if there are no UEs in the RRC-connected state within the cell, only the long periodicity synchronization signal 702a may be utilized to reduce power consumption.

In the example shown in FIG. 7, each of the synchronization signals 702a and 702b carries both a zone identifier 704 of the zone and a cell identifier 706 of the cell. In other examples, one or both of the synchronization signals 702 and 702b may carry only the zone identifier or only the cell identifier. In some examples, the synchronization signal 702a with long periodicity 708a may carry only the zone identifier 704, while the synchronization signal 702b with short periodicity 708a may carry the cell identifier 706 in addition to or in lieu of the zone identifier 704.

Figure 8:
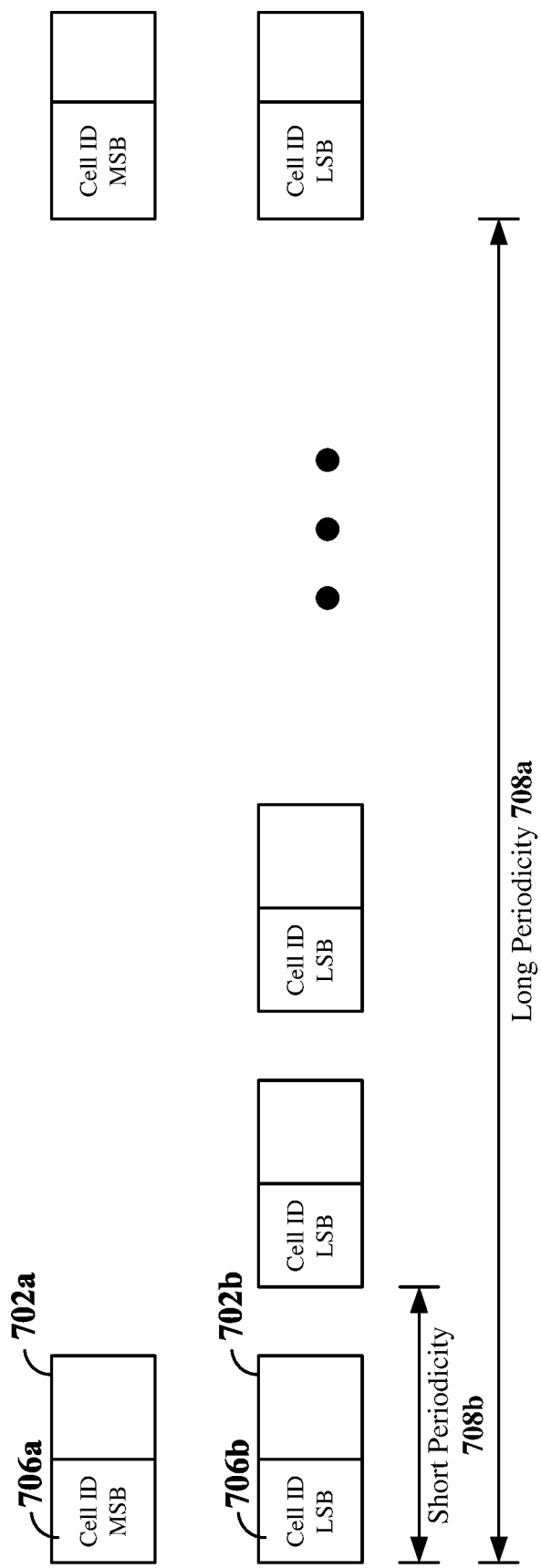
FIG. 8 is a diagram illustrating the transmission of the cell identifier utilizing synchronization signals with various periodicities according to some aspects of the present disclosure.

FIG. 8 is a diagram illustrating the transmission of the cell identifier utilizing synchronization signals 702a and 702b with various periodicities according to some aspects of the present disclosure. In the example shown in FIG. 8, both the long synchronization signal 702a and the short synchronization signal 702b are transmitted within the cell. Each synchronization signal 702a and 702b includes a different, non-overlapping portion 706a and 706b of the cell identifier (ID). For example, the long periodicity synchronization signal 702a may include the four most significant bits (MSBs) 706a of the cell ID, while the short periodicity synchronization signal 702b may include the six least significant bits (LSBs) 706b of the cell ID. That is, the combination of long and short periodicity synchronization signals 702a and 702b may carry ten bits for the cell ID 706. In addition, although not shown in FIG. 8, one or both of the synchronization signals 702a and 702b may also include the zone identifier.

Figure 9:
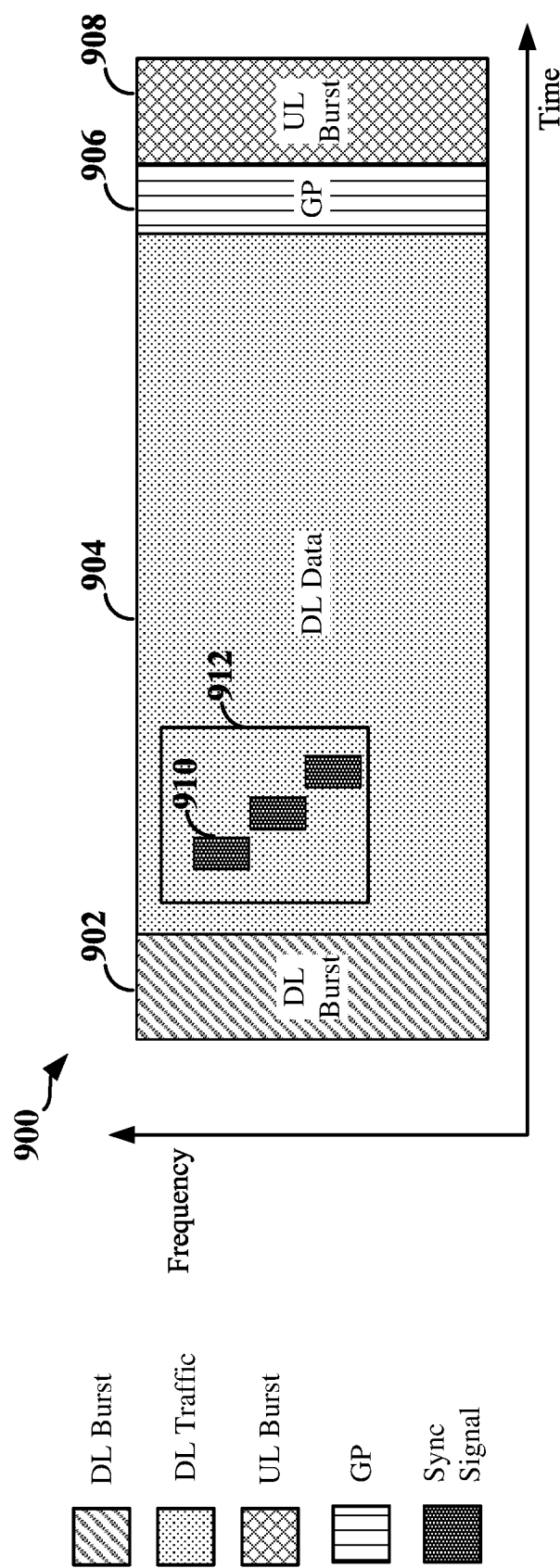
FIG. 9 illustrates a structure of a downlink-centric (DL-centric) slot including a synchronization signal repeated within a synchronization burst using a repetition pattern according to some aspects of the present disclosure.

FIG. 9 illustrates a structure of a downlink-centric (DL-centric) slot 900 including a synchronization signal repeated within a synchronization burst using a repetition pattern according to some aspects of the present disclosure. The DL-centric slot is referred to as a DL-centric slot because a majority (or, in some examples, a substantial portion) of the slot includes DL user data traffic. In the example shown in FIG. 9, time is illustrated along a horizontal axis, while frequency is illustrated along a vertical axis. The time-frequency resources of the DL-centric slot 900 may be divided into a DL common burst 902, a DL data portion 904 and an UL common burst 908.

The DL common burst 902 may exist in the initial or beginning portion of the DL-centric slot. The DL common burst 902 may include any suitable DL information in one or more channels. In some examples, the DL common burst 902 may include various scheduling information and/or control information corresponding to various portions of the DL-centric slot. In some configurations, the DL common burst 902 may include a PDCCH.

The DL-centric slot may also include a DL data portion 904. The DL data portion 904 may sometimes be referred to as the payload of the DL-centric slot. The DL data portion 904 may include the communication resources utilized to communicate DL user data traffic from the base station to the UE. In some configurations, the DL data portion 904 may include a physical DL shared channel (PDSCH).

In various aspects of the present disclosure, the DL data portion 904 may further include a synchronization signal 910 that is repeated within a synchronization burst 912 of the DL data portion 904 based on a repetition pattern. For example, the synchronization signal 910 may be transmitted within one symbol of the synchronization burst 912, and then may be repeated within one or more additional symbols of the synchronization burst 912. In other examples, the synchronization signal may be transmitted within only a portion of the downlink bandwidth (frequencies) of the slot. For example, the synchronization signal may be transmitted within a subset of a plurality of sub-bands spanning the downlink bandwidth in the frequency domain. In the example shown in FIG. 9, the synchronization signal 910 is transmitted within three different symbols/sub-bands of the synchronization burst 912, and thus, repeated three times within the synchronization burst 912.

The UL common burst 908 may include any suitable UL information in one or more channels. In some examples, the UL common burst 908 may include feedback information corresponding to various other portions of the DL-centric slot. For example, the UL common burst 908 may include feedback information corresponding to the DL common burst 902 and/or DL data portion 904. Non-limiting examples of feedback information may include an ACK signal, a NACK signal, a HARQ indicator, and/or various other suitable types of information. The UL common burst 908 may include additional or alternative information, such as information pertaining to random access channel (RACH) procedures, scheduling requests (SRs), and various other suitable types of information.

As illustrated in FIG. 9, the end of the DL data portion 904 may be separated in time from the beginning of the UL common burst 908. This time separation may sometimes be referred to as a gap, a guard period, a guard interval, and/or various other suitable terms, hereinafter referred to as a guard period (GP) 906. This separation provides time for the switch-over from DL communication (e.g., reception operation by the UE to UL communication (e.g., transmission by the UE). One of ordinary skill in the art will understand that the foregoing is merely one example of a DL-centric slot and alternative structures having similar features may exist without necessarily deviating from the aspects described herein.

FIG. 10 is a diagram illustrating a table 1000 of repetition patterns 1004 and synchronization signal transmission periodicities 1002 according to some aspects of the present disclosure. The table 1000 may correspond to the table 315 shown and described above in reference to FIG. 3.

The table 1000 may include any suitable number of periodicities of transmission 1002 (e.g., Periodicity 1, Periodicity 2, . . . , Periodicity N), and each periodicity 1002 may be associated with any suitable number of repetition patterns 1004 (e.g., Repetition Pattern 1, Repetition Pattern 2, Repetition Pattern 3, . . . , Repetition Pattern N). The number of periodicities 1002 and associated repetition patterns 1004 may be configurable for each cell, zone, or access network.

In some examples, multiple periodicities 1002 may be available in the cell, but each periodicity 1002 may have only a single respective repetition pattern 1004 associated therewith. The single respective repetition pattern 1004 may be the same repetition pattern 1004 for all periodicities 1002 or it may vary among the periodicities 1002. In other examples, only a single periodicity 1002 may be available in the cell, but that single periodicity 1002 may have multiple repetition patterns 1004 associated therewith. In still other examples, multiple periodicities 1002 may be available in the cell, but the number of repetition patterns 1004 associated with each periodicity 1002 may vary between periodicities 1002. For example, one of the periodicities 1002 may have only a single repetition pattern 1004 associated therewith, while another periodicity 1002 may have two or more repetition patterns 1004 associated therewith.

Figure 11:
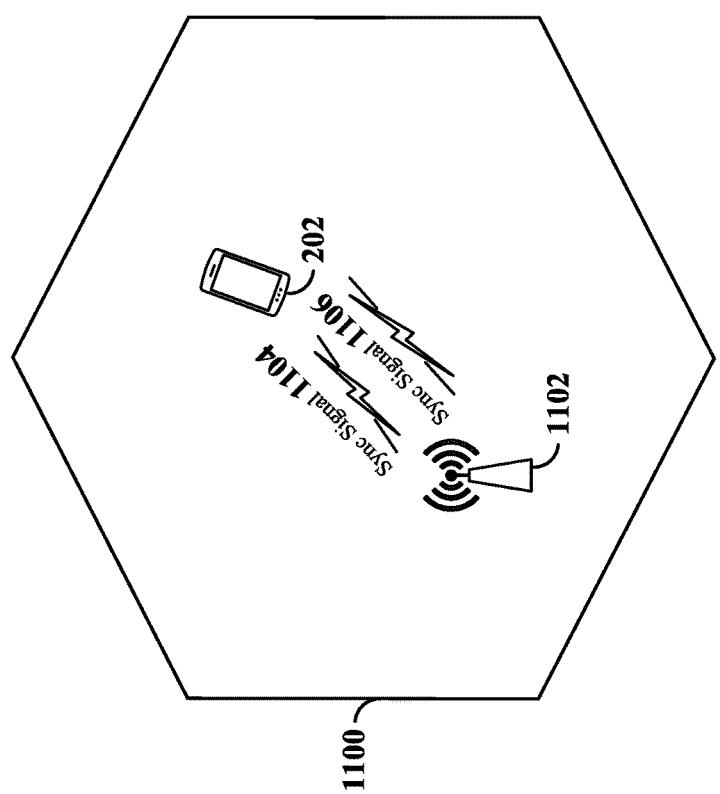
FIG. 11 is a diagram illustrating a cell deployed with dual carriers, each transmitting synchronization signals with different periodicities, according to some aspects of the present disclosure.

FIG. 11 is a diagram illustrating a cell 1100 including a base station 1102 (e.g., gNB) deployed with dual carriers, each transmitting synchronization signals with different periodicities, according to some aspects of the present disclosure. In the example shown in FIG. 11, each carrier is associated with a different radio access technology (RAT). For example, one of the RATs may be a legacy RAT, while the other RAT may be a next generation RAT. The legacy RAT is configured such that the base station 1102 sends synchronization signals 1104 with a static periodicity of transmission. The next generation RAT is configured such that the base station 1102 sends synchronization signals 1106 with a configurable periodicity of transmission.

In various aspects of the disclosure, the base station 1102 may be configured to identify the static periodicity of transmission of synchronization signals 1104 for the legacy RAT and to select the configurable periodicity of transmission of synchronization signals 1106 for the next generation RAT based on the static periodicity of transmission associated with the legacy RAT. In some examples, the base station 1102 is configured to send legacy synchronization signals 1104 with a short periodicity of transmission (e.g., 5 ms), and next generation synchronization signals 1106 with a long periodicity of transmission (e.g., 40 ms, 80 ms, or 200 ms).

Each of the synchronization signals 1104 and 1106 may be received by a user equipment (UE) 202 within the cell 1100. In various aspects of the present disclosure, the UE 202 may search for the legacy synchronization signals 1104 (e.g., the synchronization signals with the shortest synchronization signal periodicity) during the initial acquisition or neighbor cell search process. The UE 202 may then camp on the cell 1100 using the next generation synchronization signals (e.g., the synchronization signals with a longer (or configurable) periodicity) in the idle state for frequency and time refinement during the mobility measurement process. Once the UE transitions into the RRC-connected state, the base station 1102 may send only denser synchronization signals 1104 (e.g., shorter periodicity synchronization signals).

Figure 12:
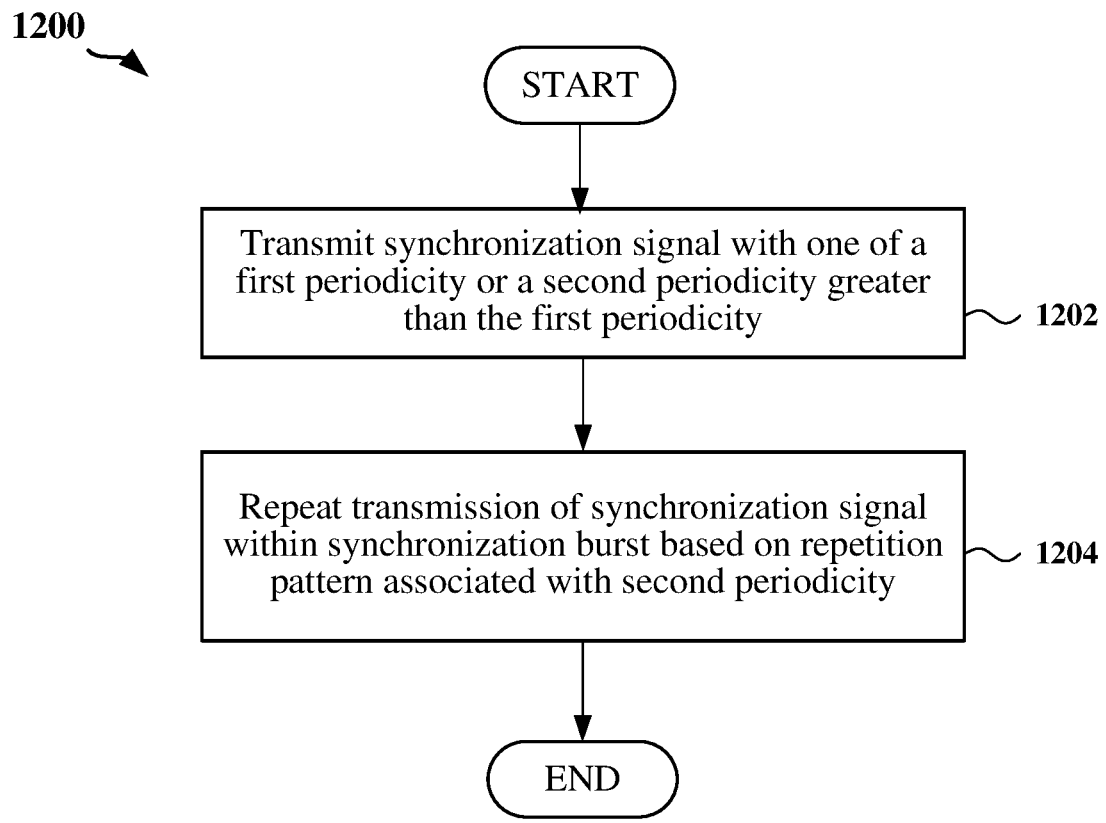
FIG. 12 is a flow chart illustrating an exemplary process for transmitting synchronization signals with variable periodicity in a wireless communication network according to some aspects of the present disclosure.

FIG. 12 is a flow chart illustrating an exemplary process 1200 for transmitting synchronization signals with variable periodicity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1200 may be carried out by the base station illustrated in FIG. 3. In some examples, the process 1200 may be carried out by any suitable apparatus or means for carrying out the functions or algorithm described below.

At block 1202, the base station (BS) may transmit a synchronization signal within a serving cell to enable a user equipment to synchronize communication with the wireless communication network. The synchronization signal may be transmitted with one of a first periodicity or a second periodicity greater than the first periodicity. For example, the first periodicity may be a short periodicity (e.g., 5 ms) and the second periodicity may be a configurable long periodicity (e.g., 40 ms, 80 ms, or 200 ms). In addition, with either the short periodicity or long periodicity, the base station may support downlink-based mobility and/or uplink-based mobility. For example, the synchronization signal configuration circuitry 344 and the DL traffic and control channel generation and transmission circuitry 342 shown and described above in reference to FIG. 3 may transmit the synchronization signal with either the short or long periodicity.

At block 1204, if the synchronization signal is transmitted with the second periodicity, the base station may repeat the synchronization signal within a synchronization burst based on a repetition pattern associated with the second periodicity. For example, the synchronization signal configuration circuitry 344 shown and described above in reference to FIG. 3 may select the repetition pattern from, for example, the table 315 of periodicities and associated repetition patterns.

Figure 13:
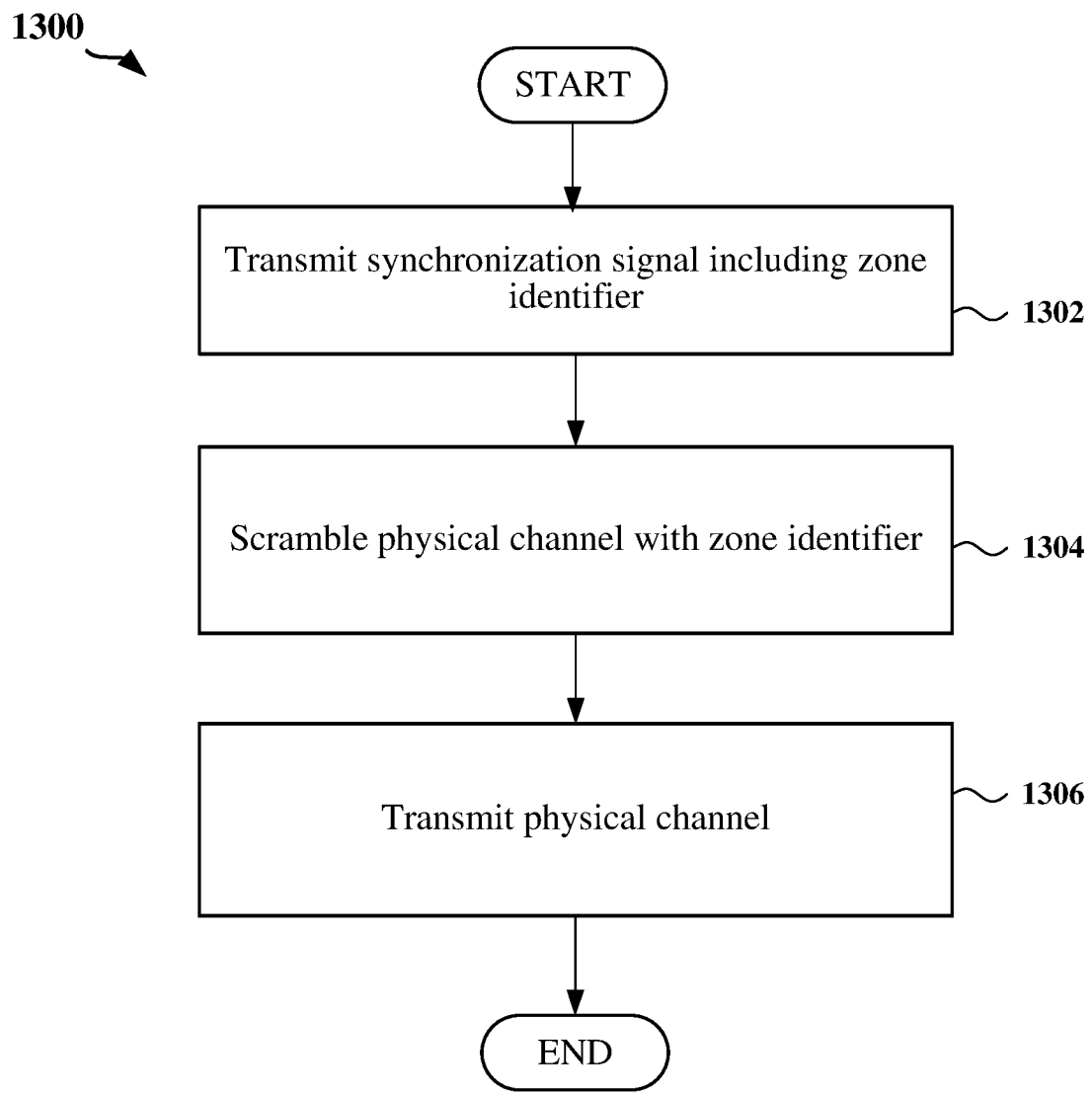
FIG. 13 is a flow chart illustrating an exemplary process for utilizing a zone identifier to scramble physical channels in a wireless communication network according to some aspects of the present disclosure.

FIG. 13 is a flow chart illustrating an exemplary process 1300 for utilizing a zone identifier to scramble physical channels in a wireless communication network according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the base station illustrated in FIG. 3. In some examples, the process 1300 may be carried out by any suitable apparatus or means for carrying out the functions or algorithm described below.

At block 1302, the base station (BS) may transmit a synchronization signal within a serving cell of a zone. The zone includes a plurality of cells including the serving cell. The synchronization signal includes a zone identifier of the zone. A UE may then utilize the synchronization signal to synchronize with the network. In some examples, the synchronization signal is an SFN synchronization signal. For example, the DL traffic and control channel generation and transmission circuitry 342 shown and described above in reference to FIG. 3 may transmit the synchronization signal.

At block 1304, the BS may scramble a physical channel with the zone identifier, and at block 1306, the BS may transmit the scrambled physical channel to the UE. In some examples, the BS may scramble a PDCCH or PDSCH carrying a paging message for the UE with the zone identifier. For example, the DL traffic and control channel generation and transmission circuitry 342 together with the transceiver 310 shown and described above in reference to FIG. 3 may scramble the physical channel carrying the paging message for the UE and transmit the scrambled physical channel to the UE.

Figure 14:
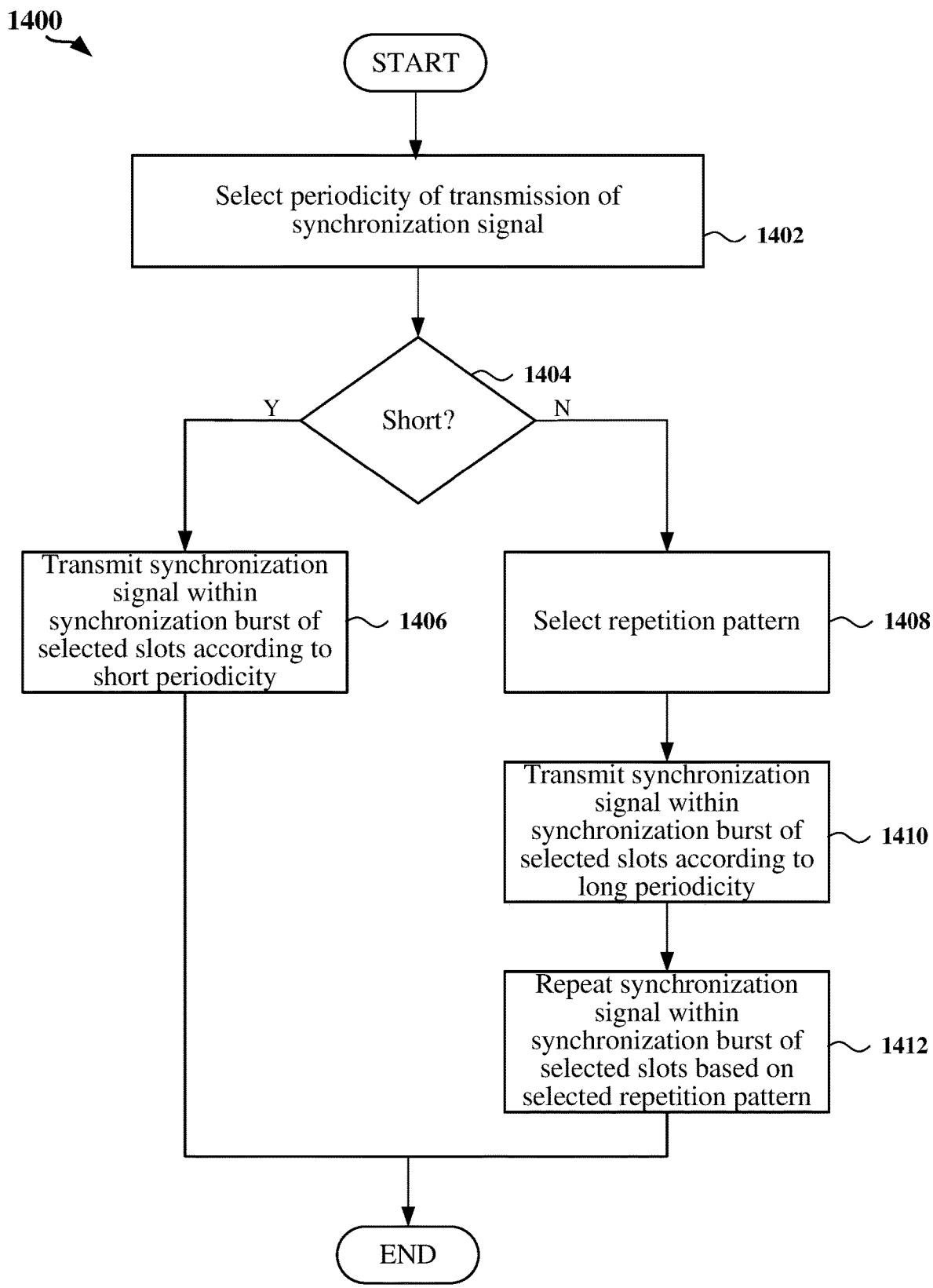
FIG. 14 is a flow chart illustrating an exemplary process for transmitting synchronization signals in a wireless communication network according to some aspects of the present disclosure.

FIG. 14 is a flow chart illustrating an exemplary process 1400 for transmitting synchronization signals in a wireless communication network according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the base station illustrated in FIG. 3. In some examples, the process 1400 may be carried out by any suitable apparatus or means for carrying out the functions or algorithm described below.

At block 1402, the base station (BS) may select a periodicity of transmission of a synchronization signal within a cell. For example, the BS may select a short periodicity of transmission (e.g., 5 ms) or a long periodicity of transmission (e.g., 40 ms, 80 ms, or 200 ms). In some examples, the periodicity of transmission may be selected based on the states (e.g., idle or connected) of UEs within the cell. For example, the synchronization signal configuration circuitry 344 shown and described above in reference to FIG. 3 may select the periodicity of transmission.

If the selected periodicity is the short periodicity of transmission (Y branch of block 1404), at block 1406, the BS may transmit the synchronization signal within a synchronization burst of selected slots according to the short periodicity. For example, the DL traffic and control channel generation and transmission circuitry 342 shown and described above in reference to FIG. 3 may transmit the synchronization signal according to the short periodicity.

If the selected periodicity is the long periodicity of transmission (N branch of block 1406), at block 1408, the BS may select a repetition pattern for repeating the synchronization signal. For example, the synchronization signal configuration circuitry 344 shown and described above in reference to FIG. 3 may select the repetition pattern from, for example, the table 315 of periodicities and associated repetition patterns.

At block 1410, the BS may transmit the synchronization signal within a synchronization burst of selected slots according to the long periodicity. In addition, at block 1412, the BS may repeat transmission of the synchronization within the synchronization burst of the selected slots based on the selected repetition pattern. For example, the DL traffic and control channel generation and transmission circuitry 342 shown and described above in reference to FIG. 3 may transmit the synchronization signal and repetitions thereof according to the long periodicity and selected repetition pattern.

Figure 15:
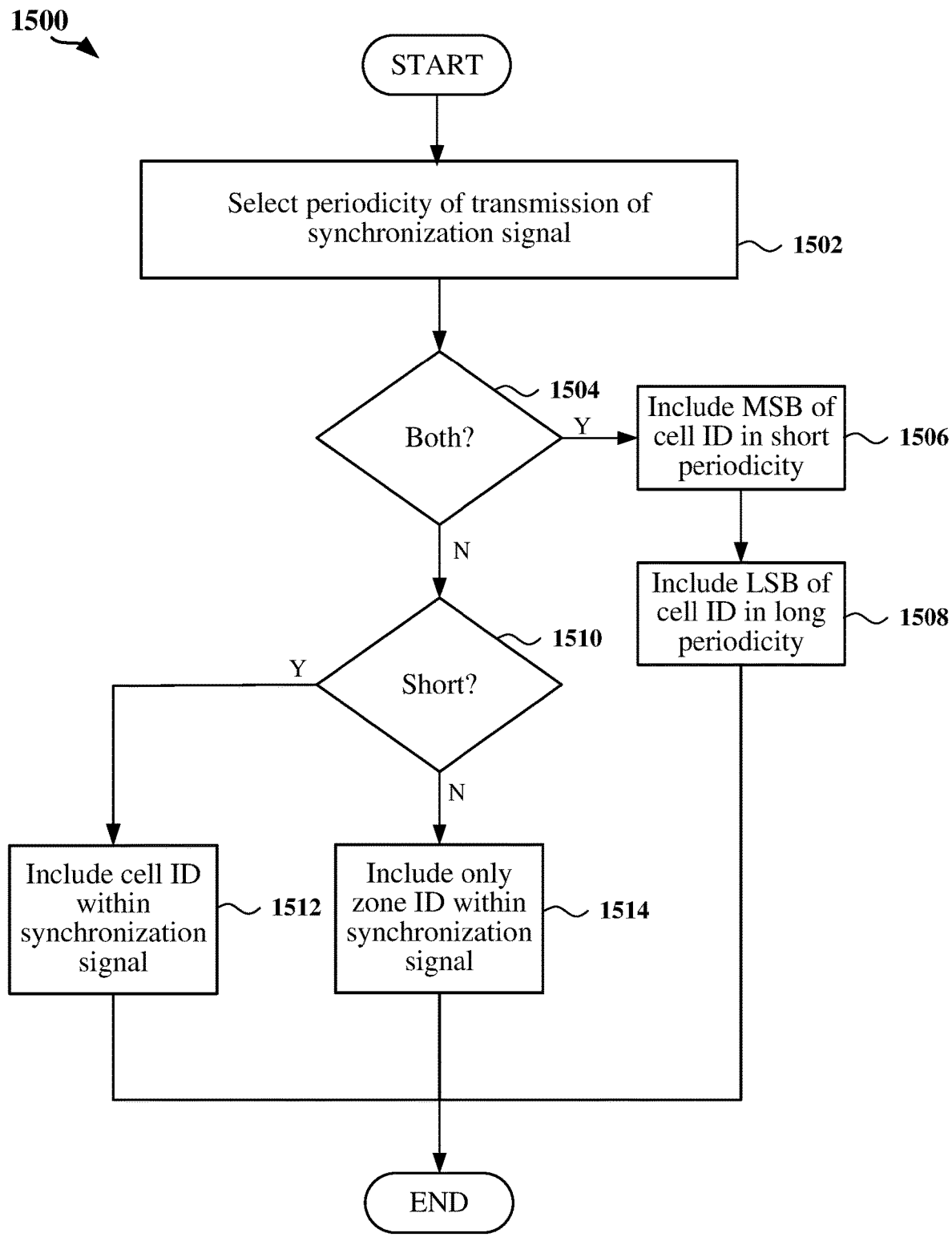
FIG. 15 is a flow chart illustrating another exemplary process for transmitting synchronization signals in a wireless communication network according to some aspects of the present disclosure.

FIG. 15 is a flow chart illustrating another exemplary process 1500 for transmitting synchronization signals in a wireless communication network according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the base station illustrated in FIG. 3. In some examples, the process 1500 may be carried out by any suitable apparatus or means for carrying out the functions or algorithm described below.

At block 1502, the base station (BS) may select a periodicity of transmission of a synchronization signal within a cell. For example, the BS may select a short periodicity of transmission (e.g., 5 ms) or a long periodicity of transmission (e.g., 40 ms, 80 ms, or 200 ms). In some examples, the periodicity of transmission may be selected based on the states (e.g., idle or connected) of UEs within the cell. For example, the synchronization signal configuration circuitry 344 shown and described above in reference to FIG. 3 may select the periodicity of transmission.

If both the long and short periodicities are selected (Y branch of block 1504), at block 1506, the BS may include a first portion (e.g., the four most significant bits) of the cell identifier (ID) of the cell in the short periodicity synchronization signal. In addition, at block 1508, the BS may include a second portion (e.g., the six least significant bits) of the cell ID in the long periodicity synchronization signal. For example, the DL traffic and control channel generation and transmission circuitry 342 shown and described above in reference to FIG. 3 may jointly signal different portions of the cell ID in both the long and short periodicity synchronization signals.

If both periodicities are not selected (N branch of block 1504), and the selected periodicity is the short periodicity of transmission (Y branch of block 1510), at block 1512, the BS may include the cell ID within the short periodicity synchronization signal. In some examples, the zone ID may also be included in the short periodicity synchronization signal. For example, the DL traffic and control channel generation and transmission circuitry 342 shown and described above in reference to FIG. 3 may transmit the cell ID within the short periodicity synchronization signal.

If the selected periodicity is the long periodicity of transmission (N branch of block 1510), at block 1514, the BS may include only the zone ID (not the cell ID) within the long periodicity synchronization signal. For example, the DL traffic and control channel generation and transmission circuitry 342 shown and described above in reference to FIG. 3 may transmit the zone ID within the long periodicity synchronization signal. In some examples, when the cell ID is signaled in the synchronization signal(s), the BS may then scramble a physical channel carrying, for example, control information, a random access response, and/or user data traffic with the cell ID instead of the zone ID.

Figure 16:
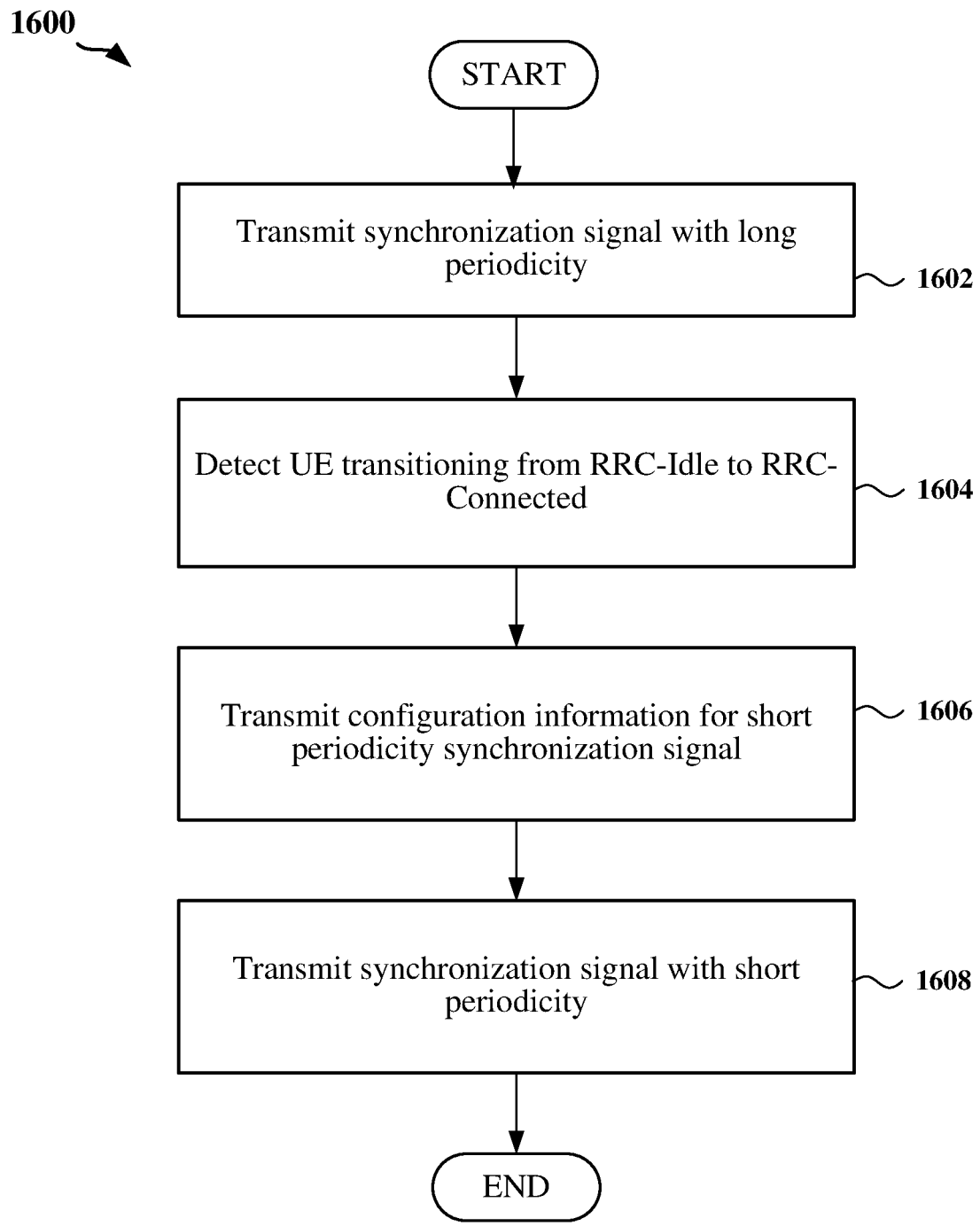
FIG. 16 is a flow chart illustrating another exemplary process for transmitting synchronization signals in a wireless communication network according to some aspects of the present disclosure.

FIG. 16 is a flow chart illustrating another exemplary process 1600 for transmitting synchronization signals in a wireless communication network according to some aspects of the present disclosure. As described below, some or all illustrated features may be omitted in a particular implementation within the scope of the present disclosure, and some illustrated features may not be required for implementation of all embodiments. In some examples, the process 1600 may be carried out by the base station illustrated in FIG. 3. In some examples, the process 1600 may be carried out by any suitable apparatus or means for carrying out the functions or algorithm described below.

At block 1602, the base station (BS) may transmit a synchronization signal with long periodicity (e.g., 40 ms, 80 ms, or 200 ms). For example, the DL traffic and control channel generation and transmission circuitry 342 shown and described above in reference to FIG. 3 may transmit the long periodicity synchronization signal.

At block 1604, the BS may detect that a UE within the cell served by the BS is transitioning from the RRC-idle state to the RRC-connected state. For example, the UL traffic and control channel reception and processing circuitry 343 shown and described above in reference to FIG. 3 may detect the UE transition.

At block 1606, in response to detecting the transitioning of the UE, the BS may transmit configuration information for a short periodicity synchronization signal. For example, the configuration information may indicate the configuration (e.g., timing) and allocated resources (time-frequency resources) for the short periodicity synchronization signal. The configuration information may further be transmitted to the UE during the RRC connection setup procedure. For example, the synchronization signal configuration circuitry 344 and DL traffic and control channel generation and transmission circuitry 342 shown and described above in reference to FIG. 3 may generate and transmit the configuration information for the short periodicity synchronization signal.

At block 1608, the BS may then transmit the synchronization signal with short periodicity to the UE. For example, the DL traffic and control channel generation and transmission circuitry 342 shown and described above in reference to FIG. 3 may generate and transmit the short periodicity synchronization signal.

Figure 17:
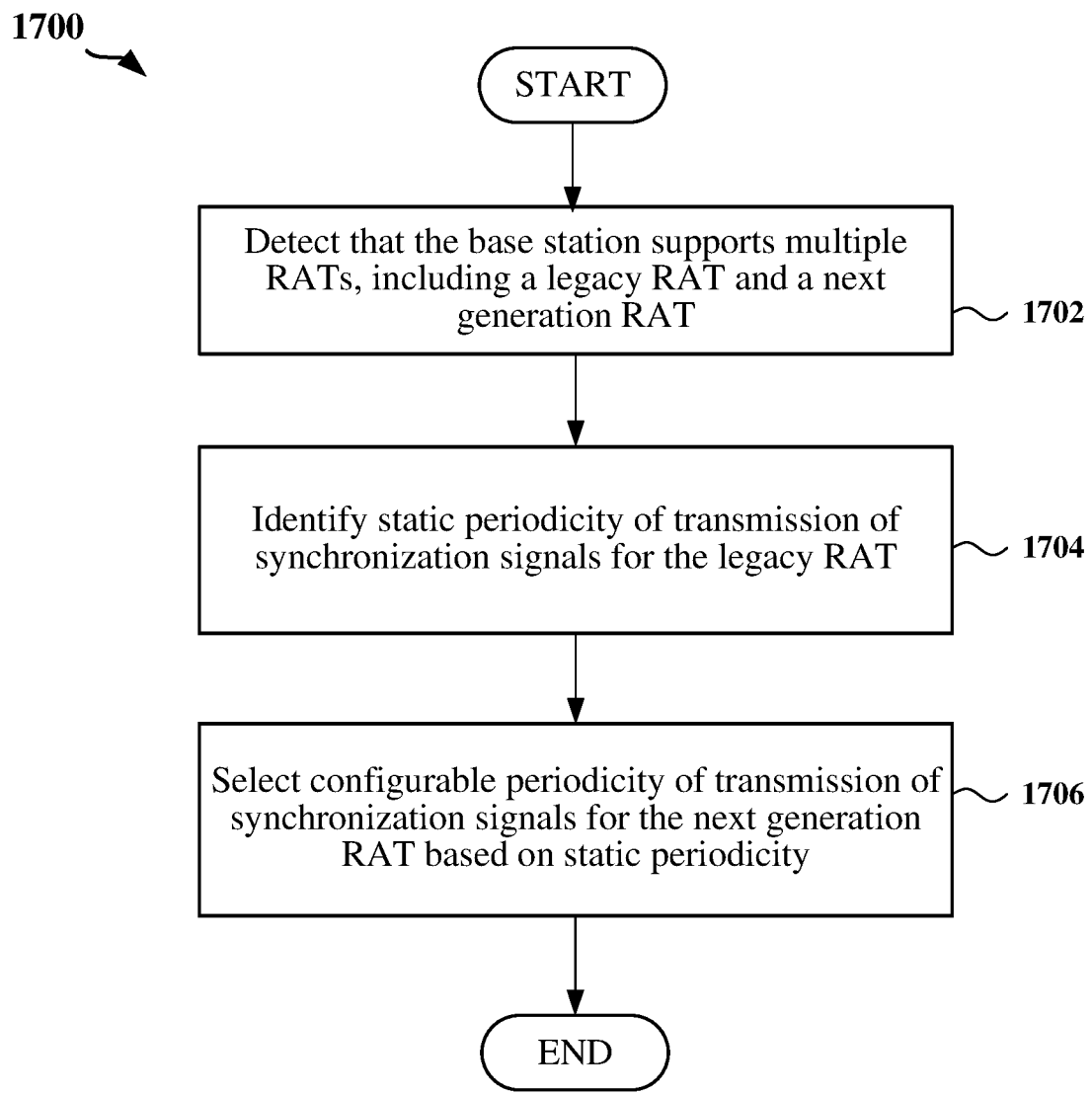
FIG. 17 is a flow chart illustrating an exemplary process for selecting a periodicity of synchronization signals in a wireless communication network according to some aspects of the present disclosure.

FIG. 17 is a flow chart illustrating an exemplary process 1700 for selecting a periodicity of synchronization signals in a wireless communication network according to some aspects of the present disclosure. As described below, some or all illustrated features may be omitted in a particular implementation within the scope of the present disclosure, and some illustrated features may not be required for implementation of all embodiments. In some examples, the process 1700 may be carried out by the base station illustrated in FIG. 3. In some examples, the process 1700 may be carried out by any suitable apparatus or means for carrying out the functions or algorithm described below.

At block 1702, the base station (BS) may detect that the base station supports at least two carriers (e.g., at least two different radio access technologies (RATs)). For example, one of the RATs may be a legacy RAT, while another RAT may be a next generation RAT. At block 1704, the BS may identify a static periodicity of transmission of synchronization signals for the legacy RAT. For example, the synchronization signal configuration circuitry 344 shown and described above in reference to FIG. 3 may identify the static periodicity of transmission of synchronization signals for the legacy RAT.

At block 1706, the BS may select a configurable periodicity of transmission of synchronization signals for the next generation RAT based on the static periodicity of transmission of the legacy RAT. In some examples, the static periodicity of transmission may be a short periodicity of transmission, and the selected configurable periodicity of transmission may be a long periodicity (e.g., 40 ms, 80 ms, or 200 ms). For example, the synchronization signal configuration circuitry 344 shown and described above in reference to FIG. 3 may select the configurable periodicity of transmission of synchronization signals for the next generation RAT.

Figure 18:
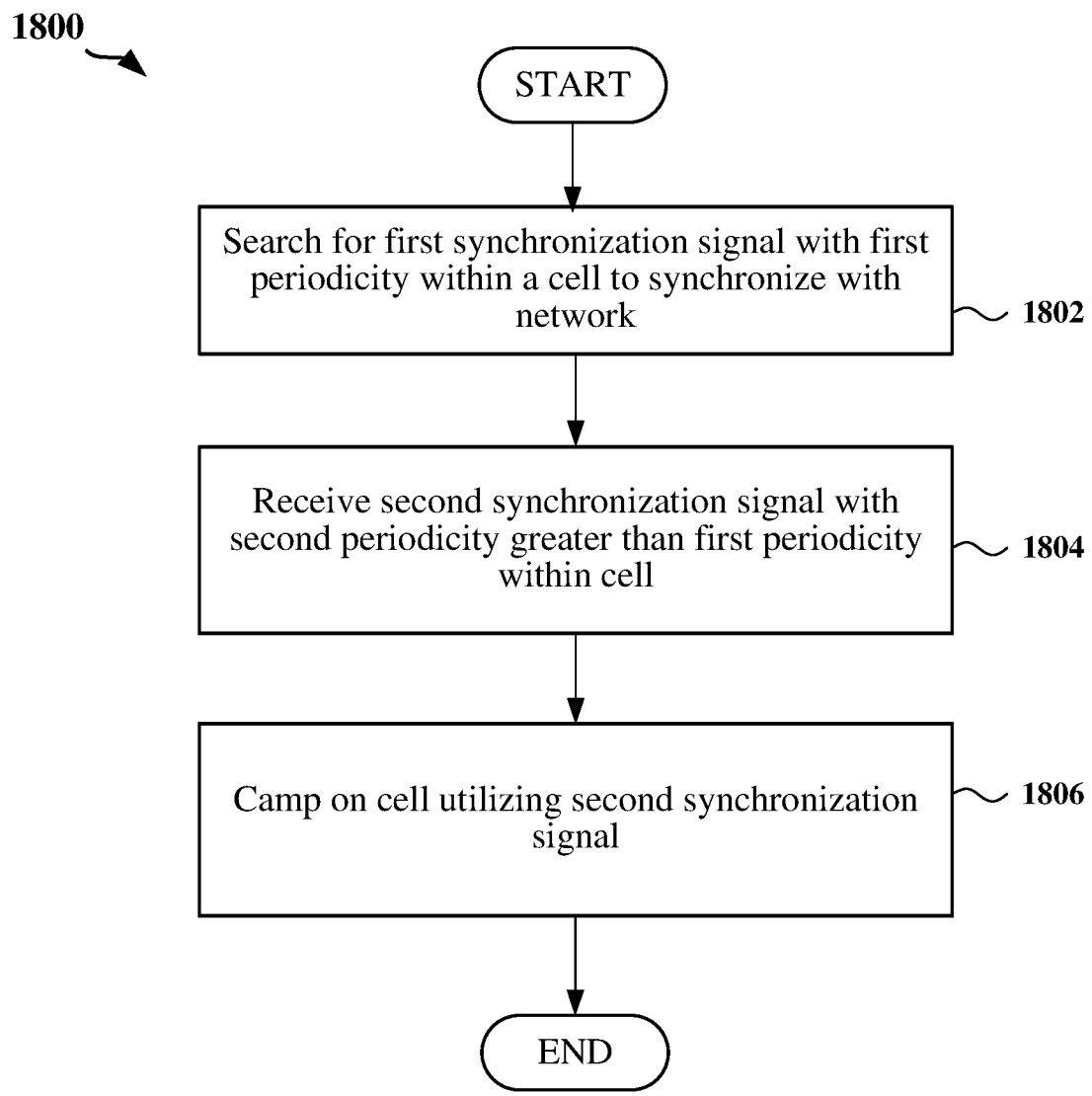
FIG. 18 is a flow chart illustrating an exemplary process for receiving synchronization signals in a wireless communication network according to some aspects of the present disclosure.

FIG. 18 is a flow chart illustrating an exemplary process 1800 for receiving synchronization signals in a wireless communication network according to some aspects of the present disclosure. As described below, some or all illustrated features may be omitted in a particular implementation within the scope of the present disclosure, and some illustrated features may not be required for implementation of all embodiments. In some examples, the process 1800 may be carried out by the user equipment illustrated in FIG. 4. In some examples, the process 1800 may be carried out by any suitable apparatus or means for carrying out the functions or algorithm described below.

At block 1802, the user equipment (UE) may search for a first synchronization signal with a first periodicity transmitted within a cell to synchronize communication with the wireless communication network. In some examples, the first synchronization signal is associated with a legacy RAT supported by the cell and the first periodicity is a short periodicity (e.g., 5 ms). The UE may utilize the first synchronization signal to perform an initial acquisition or a neighbor cell search. For example, the DL traffic and control channel reception and processing circuitry 444 and synchronization signal reception and processing circuitry 443 shown and described above in reference to FIG. 4 may receive the first synchronization signal to synchronize with the network.

At block 1804, the UE may receive a second synchronization signal transmitted in the cell with a second periodicity greater than the first periodicity. In some examples, the second synchronization signal is associated with a next generation RAT and the second periodicity is a long periodicity (e.g., 40 ms, 80 ms, or 200 ms). For example, the DL traffic and control channel reception and processing circuitry 444 shown and described above in reference to FIG. 4 may receive the second synchronization signal.

At block 1808, the UE may camp on the cell utilizing the second synchronization signal. In some examples, the UE may utilize the second synchronization signal for frequency and time refinement when performing a mobility measurement. In addition, the UE may receive the second synchronization signal with the second periodicity in an idle state, and then receive either the first synchronization signal or the second synchronization signal with a third periodicity less than the second periodicity in a connected state. For example, the third periodicity may be any other suitable periodicity shorter than the second periodicity. For example, the DL data and control channel reception and processing circuitry 444 and synchronization signal reception and processing circuitry 443 shown and described above in reference to FIG. 4 may camp on the cell utilizing the second synchronization signal.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network, the method comprising:

transmitting a synchronization signal within a serving cell to enable a user equipment to synchronize communication with the wireless communication network, wherein the synchronization signal is transmitted with at least one of a first periodicity or a second periodicity longer than the first periodicity, wherein the first periodicity comprises a first set of synchronization bursts, each within a single respective first slot of a plurality of slots forming a radio frame, wherein the second periodicity comprises a second set of synchronization bursts, each within a single respective second slot of the plurality of slots; and repeating the same synchronization signal within each synchronization burst of the second set of synchronization bursts based on a repetition pattern associated with the second periodicity to transmit the synchronization signal at least twice within each of the synchronization bursts of the second set of synchronization bursts.

2. The method of claim 1, further comprising selecting the repetition pattern from a set of two or more repetition patterns associated with the second periodicity.

3. The method of claim 1, wherein the synchronization signal comprises a zone identifier of a zone comprising a plurality of cells, the plurality of cells comprising the serving cell, and further comprising:

scrambling a physical channel carrying a paging message with the zone identifier; and transmitting the physical channel carrying the paging message to the user equipment.

4. The method of claim 1, further comprising:

if the synchronization signal is transmitted with the first periodicity, including a cell identifier of the serving cell within the synchronization signal.

5. The method of claim 4, further comprising:

scrambling a physical channel with the cell identifier; and transmitting the physical channel to the user equipment;

wherein the physical channel comprises control information, a random access response, or user data traffic.

6. The method of claim 1, further comprising:

if the synchronization signal is transmitted with both the first periodicity and the second periodicity:

including a first portion of a cell identifier of the serving cell within the synchronization signal transmitted with the first periodicity; and including a second portion of the cell identifier within the synchronization signal transmitted with the second periodicity, wherein the first portion of the cell identifier and the second portion of the cell identifier are non-overlapping.

7. The method of claim 1, further comprising:

switching from the second periodicity to the first periodicity when the user equipment transitions into a connected state.

8. The method of claim 7, further comprising:

transmitting configuration information for the synchronization signal with the first periodicity to the user equipment during the transition into the connected state.

9. The method of claim 1, wherein the synchronization signal comprises a single-frequency-network synchronization signal.

10. The method of claim 1, wherein the serving cell supports a first radio access technology and a second radio access technology different than the first radio access technology, and further comprising:

identifying a static periodicity of transmission of synchronization signals for the first radio access technology within the serving cell; and selecting a configurable periodicity of transmission of synchronization signals for the second radio access technology within the serving cell based on the static periodicity of transmission;

wherein the configurable periodicity of transmission is different than the static periodicity of transmission.

11. An apparatus in a wireless communication network, comprising:

a processor;

a transceiver communicatively coupled to the processor; and a memory communicatively coupled to the processor, wherein the processor is configured to:

transmit a synchronization signal within a serving cell to enable a user equipment to synchronize communication with the wireless communication network, wherein the synchronization signal is transmitted with at least one of a first periodicity or a second periodicity longer than the first periodicity, wherein the first periodicity comprises a first set of synchronization bursts, each within a single respective first slot of a plurality of slots forming a radio frame, wherein the second periodicity comprises a second set of synchronization bursts, each within a single respective second slot of the plurality of slot; and repeat the same synchronization signal within each synchronization burst of the second set of synchronization bursts based on a repetition pattern associated with the second periodicity to transmit the synchronization signal at least twice within each of the synchronization bursts of the second set of synchronization bursts.

12. The apparatus of claim 11, wherein the processor is further configured to:

select the repetition pattern from a set of two or more repetition patterns associated with the second periodicity.

13. The apparatus of claim 11, wherein the synchronization signal comprises a zone identifier of a zone comprising a plurality of cells, the plurality of cells comprising the serving cell, and wherein the processor is further configured to:

scramble a physical channel carrying a paging message with the zone identifier; and transmit the physical channel carrying the paging message to the user equipment.

14. The apparatus of claim 11, wherein the processor is further configured to:

if the synchronization signal is transmitted with the first periodicity, include a cell identifier of the serving cell within the synchronization signal.

15. The apparatus of claim 11, wherein the processor is further configured to:

if the synchronization signal is transmitted with both the first periodicity and the second periodicity:

include a first portion of a cell identifier of the serving cell within the synchronization signal transmitted with the first periodicity; and include a second portion of the cell identifier within the synchronization signal transmitted with the second periodicity, wherein the first portion of the cell identifier and the second portion of the cell identifier are non-overlapping.

16. The apparatus of claim 11, wherein the processor is further configured to:
switch from the second periodicity to the first periodicity when the user equipment transitions into a connected state.

17. The apparatus of claim 16, wherein the processor is further configured to:
transmit configuration information for the synchronization signal with the first periodicity to the user equipment during the transition into the connected state.

18. The apparatus of claim 11, wherein the synchronization signal comprises a single-frequency-network synchronization signal.

19. The apparatus of claim 11, wherein the serving cell supports a first radio access technology and a second radio access technology different than the first radio access technology, and wherein the processor is further configured to:
identify a static periodicity of transmission of synchronization signals for the first radio access technology within the serving cell; and
select a configurable periodicity of transmission of synchronization signals for the second radio access technology within the serving cell based on the static periodicity of transmission;
wherein the configurable periodicity of transmission is different than the static periodicity of transmission.

20. An apparatus in a wireless communication network, comprising:
means for transmitting a synchronization signal within a serving cell to enable a user equipment to synchronize communication with the wireless communication network, wherein the synchronization signal is transmitted with at least one of a first periodicity or a second periodicity longer than the first periodicity, wherein the first periodicity comprises a first set of synchronization bursts, each within a single respective first slot of a plurality of slots forming a radio frame, wherein the second periodicity comprises a second set of synchronization bursts, each within a single respective second slot of the plurality of slots; and
means for repeating the same synchronization signal within each synchronization burst of the second set of synchronization bursts based on a repetition pattern associated with the second periodicity to transmit the synchronization signal at least twice within each of the synchronization bursts of the second set of synchronization bursts.

21. The apparatus of claim 20, further comprising:
means for selecting the repetition pattern from a set of two or more repetition patterns associated with the second periodicity.

22. The apparatus of claim 20, wherein the synchronization signal comprises a zone identifier of a zone comprising a plurality of cells, the plurality of cells comprising the serving cell, and further comprising:
means for scrambling a physical channel carrying a paging message with the zone identifier; and
means for transmitting the physical channel carrying the paging message to the user equipment.

23. The apparatus of claim 20, further comprising:
if the synchronization signal is transmitted with the first periodicity, means for including a cell identifier of the serving cell within the synchronization signal.

24. The apparatus of claim 20, further comprising:
if the synchronization signal is transmitted with both the first periodicity and the second periodicity:
means for including a first portion of a cell identifier of the serving cell within the synchronization signal transmitted with the first periodicity; and
means for including a second portion of the cell identifier within the synchronization signal transmitted with the second periodicity, wherein the first portion of the cell identifier and the second portion of the cell identifier are non-overlapping.

25. The apparatus of claim 20, further comprising:
means for switching from the second periodicity to the first periodicity when the user equipment transitions into a connected state.

26. The apparatus of claim 20, wherein the serving cell supports a first radio access technology and a second radio access technology different than the first radio access technology, and further comprising:
means for identifying a static periodicity of transmission of synchronization signals for the first radio access technology within the serving cell; and
means for selecting a configurable periodicity of transmission of synchronization signals for the second radio access technology within the serving cell based on the static periodicity of transmission;
wherein the configurable periodicity of transmission is different than the static periodicity of transmission.

27. A method of wireless communication in a wireless communication network, the method comprising:
receiving a synchronization signal within a serving cell at a user equipment to enable the user equipment to synchronize communication with the wireless communication network, wherein the synchronization signal is transmitted with at least one of a first periodicity or a second periodicity longer than the first periodicity, wherein the first periodicity comprises a first set of synchronization bursts, each within a single respective first slot of a plurality of slots forming a radio frame, wherein the second periodicity comprises a second set of synchronization bursts, each within a single respective second slot of the plurality of slots; and
receiving at least one repetition of the same synchronization signal within each synchronization burst of the second set of synchronization bursts based on a repetition pattern associated with the second periodicity to receive the synchronization signal at least twice within each of the synchronization bursts of the second set of synchronization bursts.

28. The method of claim 27, wherein the synchronization signal comprises a first synchronization signal and a second synchronization signal, and further comprising:
searching for the first synchronization signal within a serving cell, wherein the first synchronization signal is transmitted with the first periodicity;
synchronizing communication with the wireless communication network utilizing the first synchronization signal;
receiving the second synchronization signal within the serving cell, wherein the second synchronization signal is transmitted with the second periodicity; and
camping on the serving cell utilizing the second synchronization signal.

29. The method of claim 28, further comprising:
utilizing the first synchronization signal to perform an initial acquisition or a neighbor cell search; and
utilizing the second synchronization signal for frequency and time refinement when performing a mobility measurement.

30. The method of claim 28, further comprising:
receiving the second synchronization signal with the second periodicity in an idle state; and
receiving the second synchronization signal with a third periodicity less than the second periodicity in a connected state.

* * * * *